(12) United States Patent
Sugeno et al.

(10) Patent No.: US 10,069,311 B2
(45) Date of Patent: Sep. 4, 2018

(54) POWER STORAGE DEVICE AND METHOD OF CONTROLLING POWER STORAGE DEVICE

(71) Applicant: Murata Manufacturing Co., Ltd., Kyoto (JP)

(72) Inventors: Naoyuki Sugeno, Fukushima (JP); Kohki Watanabe, Fukushima (JP); Masumi Terauchi, Fukushima (JP); Shuichi Takizawa, Fukushima (JP); Noritoshi Imamura, Miyagi (JP); Koji Umetsu, Miyagi (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 42 days.

(21) Appl. No.: 14/917,495

(22) PCT Filed: Jun. 26, 2014

(86) PCT No.: PCT/JP2014/003411
§ 371 (c)(1),
(2) Date: Mar. 8, 2016

(87) PCT Pub. No.: WO2015/040779
PCT Pub. Date: Mar. 26, 2015

(65) Prior Publication Data
US 2016/0218528 A1    Jul. 28, 2016

(30) Foreign Application Priority Data
Sep. 17, 2013 (JP) ................................ 2013-191811

(51) Int. Cl.
*H02J 7/00* (2006.01)
*B60L 11/18* (2006.01)
(Continued)

(52) U.S. Cl.
CPC .......... *H02J 7/0019* (2013.01); *B60L 11/184* (2013.01); *B60L 11/1816* (2013.01);
(Continued)

(58) Field of Classification Search
CPC ........ H02J 7/0019; H02J 7/0016; H02J 7/007; H02J 7/02; B60L 11/1816; B60L 11/1824;
(Continued)

(56) References Cited

U.S. PATENT DOCUMENTS

| 8,816,639 | B2* | 8/2014 | Lu ........................ H02J 7/0016 320/116 |
| 2012/0034503 | A1* | 2/2012 | Toyama ................ H01M 4/131 429/91 |
| 2015/0295430 | A1* | 10/2015 | Wright .................. H02J 7/0003 320/162 |

FOREIGN PATENT DOCUMENTS

| CN | 101960690 A | 1/2011 |
| CN | 102969748 A | 3/2013 |

(Continued)

OTHER PUBLICATIONS

Office Action for CN Patent Application No. 201480049788.3, dated Jan. 26, 2018, 7 pages of Office Action and 8 pages of English Translation.

*Primary Examiner* — Stacy Whitmore
(74) *Attorney, Agent, or Firm* — Chip Law Group

(57) ABSTRACT

A power storage device includes: power storage units each including at least one battery, the power storage units being connected in series; cell balance units connected in parallel to the respective power storage units via switches; and a control unit that performs control to charge the power storage units with a first constant current value, and, when the power storage unit having the highest voltage among the power storage units reaches a first potential, connect the (Continued)

corresponding one of the cell balance units to the power storage unit having the highest voltage, and switch the charging current to a second constant current value that is smaller than the first constant current value.

8 Claims, 17 Drawing Sheets

(51) Int. Cl.
    *H01M 10/42*     (2006.01)
    *H02J 7/02*     (2016.01)
    *H01M 10/44*     (2006.01)
    *H01M 10/48*     (2006.01)

(52) U.S. Cl.
    CPC ....... *B60L 11/1824* (2013.01); *B60L 11/1862* (2013.01); *B60L 11/1866* (2013.01); *H01M 10/425* (2013.01); *H01M 10/441* (2013.01); *H01M 10/482* (2013.01); *H02J 7/007* (2013.01); *H02J 7/0016* (2013.01); *H02J 7/02* (2013.01); *B60L 2240/545* (2013.01); *B60L 2240/547* (2013.01); *B60L 2240/549* (2013.01); *H01M 2010/4271* (2013.01); *H02J 7/0021* (2013.01); *Y02T 10/7005* (2013.01); *Y02T 10/7044* (2013.01); *Y02T 10/7061* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
    CPC ................ B60L 11/184; B60L 11/1862; B60L 11/1866; H01M 10/425; H01M 10/441; H01M 10/482
    USPC ........ 320/107, 116, 119, 121–122, 127–128, 320/134
    See application file for complete search history.

(56) References Cited

FOREIGN PATENT DOCUMENTS

| | | |
|---|---|---|
| JP | 09-507378 A | 7/1997 |
| JP | 2000-014030 A | 1/2000 |
| JP | 2002-369398 A | 12/2002 |
| JP | 2007-330003 | 12/2007 |
| JP | 2007-330003 A | 12/2007 |
| JP | 2011-118484 A | 6/2011 |
| JP | 2012-60691 A | 3/2012 |
| JP | 2012-135154 A | 7/2012 |
| WO | 2011/118484 A1 | 9/2011 |

\* cited by examiner

POWER STORAGE DEVICE AND METHOD OF CONTROLLING POWER STORAGE DEVICE

TECHNICAL FIELD

The present disclosure relates to a power storage device and a method of controlling the power storage device.

BACKGROUND ART

In a known power storage apparatus, power storage modules are connected, and a common control device (also called the main controller where appropriate) is provided for the power storage modules. Each of the power storage modules has a module controller, and communication is performed between the module controller and the main controller via a communication channel.

So as to monitor the condition of a power storage unit and detect malfunction, the module controller includes a monitoring circuit and a microcomputer (also called the sub micro-controller unit where appropriate). The power storage unit is formed with series-connected sub modules, for example. The monitoring circuit monitors the voltages of the respective sub modules, compares the voltages of the respective sub modules with a predetermined threshold value using a comparator, and outputs detection signals (1-bit detection signals, for example) indicating normality/abnormality.

At a time of charging, the voltage of each sub module is compared with a predetermined value, and a detection signal indicating whether the voltage is an overvoltage (also referred to as OV where appropriate) is generated. At a time of discharging, the voltage of each sub module is compared with a predetermined value, and a detection signal indicating whether the voltage is an undervoltage (also referred to as UV where appropriate) is generated. At a time of charging/discharging, the value of the current flowing in the sub modules is compared with a predetermined value, and a detection signal indicating whether the current is an overcurrent (also referred to as OC where appropriate) is generated. Further, at a time of charging/discharging, the temperature of each sub module is compared with a predetermined value, and a detection signal indicating whether the temperature is an overtemperature (also referred to as OT where appropriate) is generated.

Further, when a power storage module is charged, the voltages and the currents of the respective sub modules are supplied to the sub micro-controller unit of each module, and balance adjustment is performed to equalize the voltages of the sub modules. Without the balance adjustment, some of the sub modules will not be sufficiently charged due to variation among the sub modules.

For the balance adjustment, the above described detection signals from the monitoring circuit are supplied to the sub micro-controller unit. Further, the detection signals are transferred from the module controller to the microcomputer (also called the main micro-controller unit where appropriate) of the main controller via a communication channel. The main controller receives detection signals from the respective power storage modules, and controls charging/discharging operations.

For example, according to Patent Document 1 mentioned below, when there is a sub module that has a voltage difference from the highest voltage detected from sub modules (cell blocks) within a discharging voltage range, charging is temporarily stopped, and the sub module as well as the sub module having the highest voltage is made to discharge, to update the highest voltage after the discharging. The cell balance adjustment is repeated until the voltage difference between the highest voltage and the lowest voltage falls within a predetermined voltage range, so that the time required for cell balance control can be shortened, according to Patent Document 1.

CITATION LIST

Patent Document

Patent Document 1: Japanese Patent Application Laid-Open No. 2012-60691

SUMMARY OF THE INVENTION

Problems to be Solved by the Invention

According to Patent Document 1, charging is repeatedly enabled and disabled. Therefore, if there are differences in characteristics among the sub modules, the time required for reaching a fully charged state becomes considerably long, and noise is generated as the charging is repeatedly enabled and disabled.

Therefore, the present disclosure aims to provide a power storage device that can complete charging in a short time and prevent generation of noise, and a method of controlling the power storage device.

Solutions to Problems

The present disclosure is a power storage device that includes:

power storage units each including at least one battery, the power storage units being connected in series;

cell balance units connected in parallel to the respective power storage units via switches; and a control unit that performs control to charge the power storage units with a first constant current value, and, when the power storage unit having the highest voltage among the power storage units reaches a first potential, connect the corresponding one of the cell balance units to the power storage unit having the highest voltage, and switch the charging current to a second constant current value that is smaller than the first constant current value.

Effects of the Invention

According to the present disclosure, the time required for completing charging can be shortened, and generation noise can be prevented. It should be noted that the effects to be achieved are not limited to the effect described above, and may include any of the effects described in the present disclosure.

MODES FOR CARRYING OUT THE INVENTION

Figure 1:
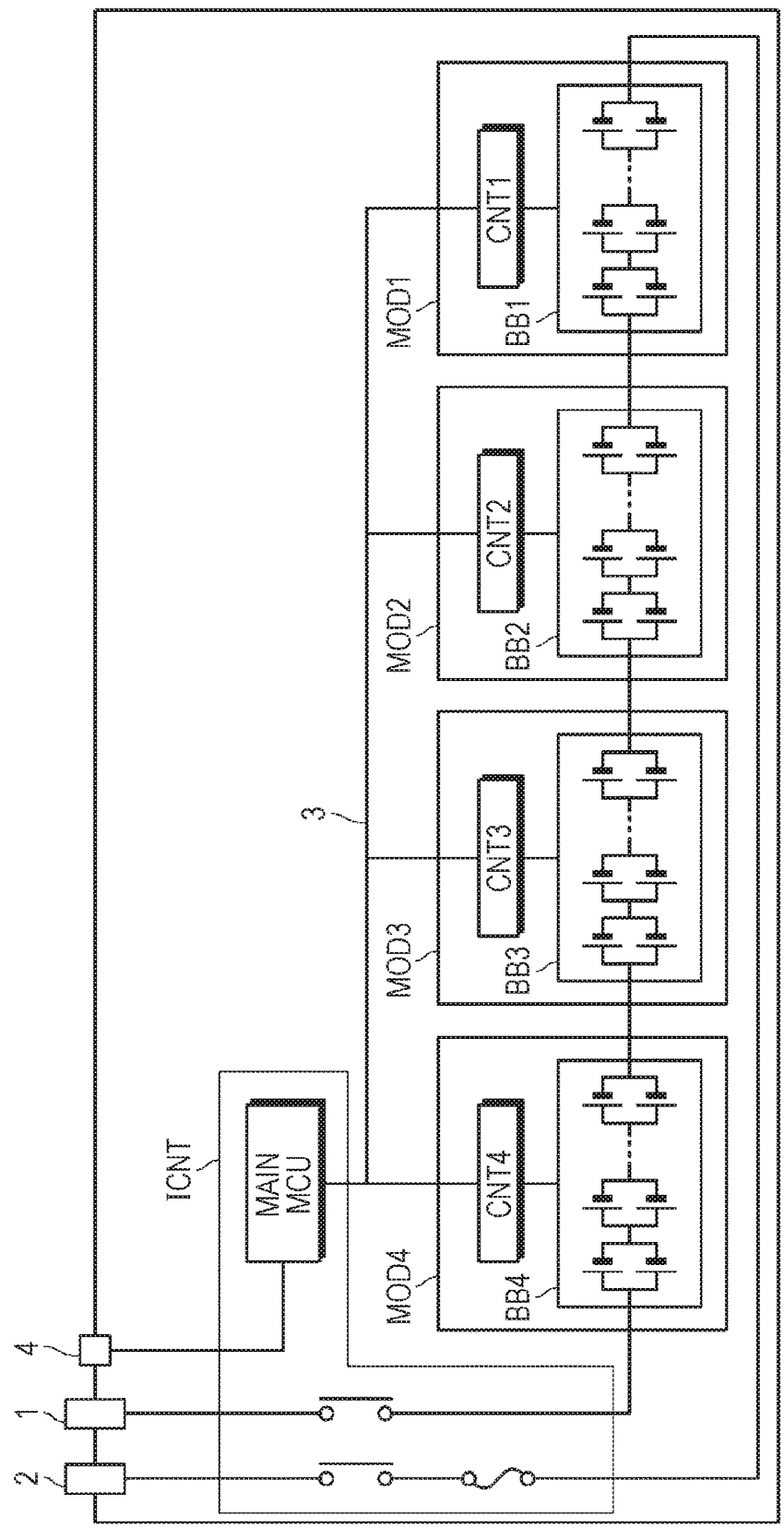
FIG. 1 is a block diagram of an example of a power storage apparatus.

The embodiments described below are preferred specific examples of the present disclosure, and various preferred technical restrictions are put thereon. However, the scope of the present disclosure is not limited by those embodiments, unless otherwise specified in the described below.

The present disclosure will be explained in the following order.

<1. First Embodiment of the Present Disclosure>
<2. Second Embodiment of the Present Disclosure>
<3. Applications>
<4. Modifications>

1. First Embodiment of the Present Disclosure

[Power Storage Apparatus]

Where a large number of power storage elements such as battery cells are used for generating high power, a structure in which power storage units (hereinafter referred to as power storage modules) are connected, and a control device is provided for the power storage modules is employed. Such a structure is called a power storage apparatus. Further, it is possible to form a power storage system in which power storage apparatuses are connected. Other than battery cells, capacitors may be used as the power storage elements.

A power storage module is a unit formed with a combination of a power storage unit including series-connected battery cells such as lithium ion secondary cells or series-connected sub modules each consisting of parallel-connected battery cells, and a module controller provided for each module. The sub micro-controller unit of each module controller is connected to the main micro-controller unit of the main controller that is the overall control device via a data transmission channel (a bus), and the main micro-controller unit performs charge management, discharge management, and management of degradation control and the like.

A serial interface is used as the bus. Specifically, an Inter-Integrated Circuit (I2C) method, a System Management (SM) bus, a Controller Area Network (CAN), a Serial Peripheral Interface (SPI), or the like is used as the serial interface.

Communication according to the I2C method is used, for example. This method is designed for performing serial communication with a directly connected device located at a relatively short distance. One master and one or more slaves are connected by two lines. With the standard being the crosstalk transmitted through one of the lines, data signals are transferred through the other one of the lines. Each of the slaves has an address included in data, and data is transferred while acknowledge is returned from the receiving side for each byte so as to confirm each other. In the case of the power storage apparatus, the main micro-controller unit serves as the master, and the sub micro-controller units serve as the slaves.

Data is transmitted from the sub micro-controller unit of each module controller to the main micro-controller unit. For example, information about the internal state of each power storage module, or battery information such as information about the voltages of the respective battery cells and the voltage of the entire module, information about current, and information about temperature is transmitted from the sub micro-controller unit to the main micro-controller unit, so that the charging process and the discharging process for each power storage module is managed.

FIG. 1 shows a specific example of the connection structure in the power storage apparatus. Four power storage modules MOD1 through MOD4 are connected in series, for example. In this case, the output voltage of the entire power storage apparatus, such as approximately 200 V, is applied to a positive terminal 1 (VB+) and a negative terminal 2 (VB−), for example. The power storage modules MOD1 through MOD4, respectively, include module controllers CNT1 through CNT4, and power storage units BB1 through BB4 in which parallel-connected battery cells or sub modules are connected. The power storage units BB1 through BB4 are connected via a power supply line.

Each of the module controllers includes a monitoring circuit and a sub control unit, as will be described later. The main controller ICNT and the module controllers CNT1 through CNT4 are connected via a common serial communication bus 3. Battery information such as the voltages of the respective modules is transmitted from the respective module controllers to the main controller ICNT. The main controller ICNT further includes a communication terminal 4 so that communication with the outside such as an electronic control unit can be performed.

Figure 2:
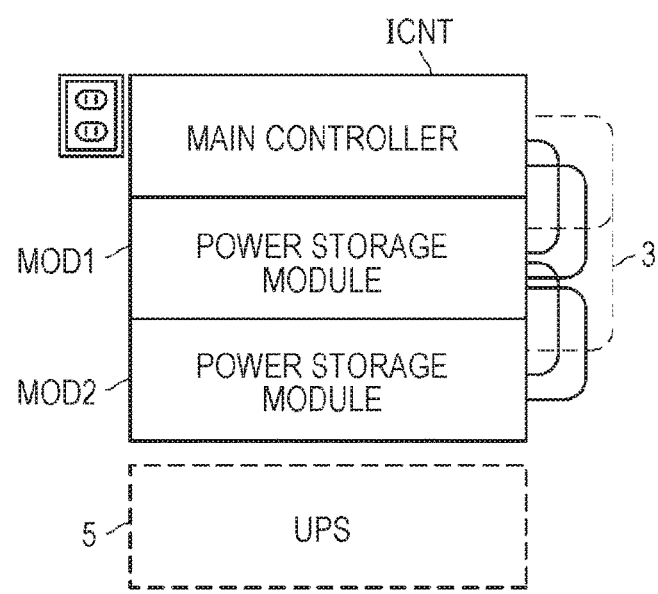
FIG. 2 is a schematic diagram showing an example of the external appearance of a power storage apparatus being used.

As shown in FIG. 2, two power storage modules MOD1 and MOD2, and the main controller ICNT each has a box-like casing, and are stacked for use, for example. As an option, an Uninterruptable Power Supply (UPS) 5 is used in some cases. As indicated by a dashed line in FIG. 2, the main controller ICNT and the module controllers CNT of the respective power storage modules are connected by the bus 3.

Figure 3:
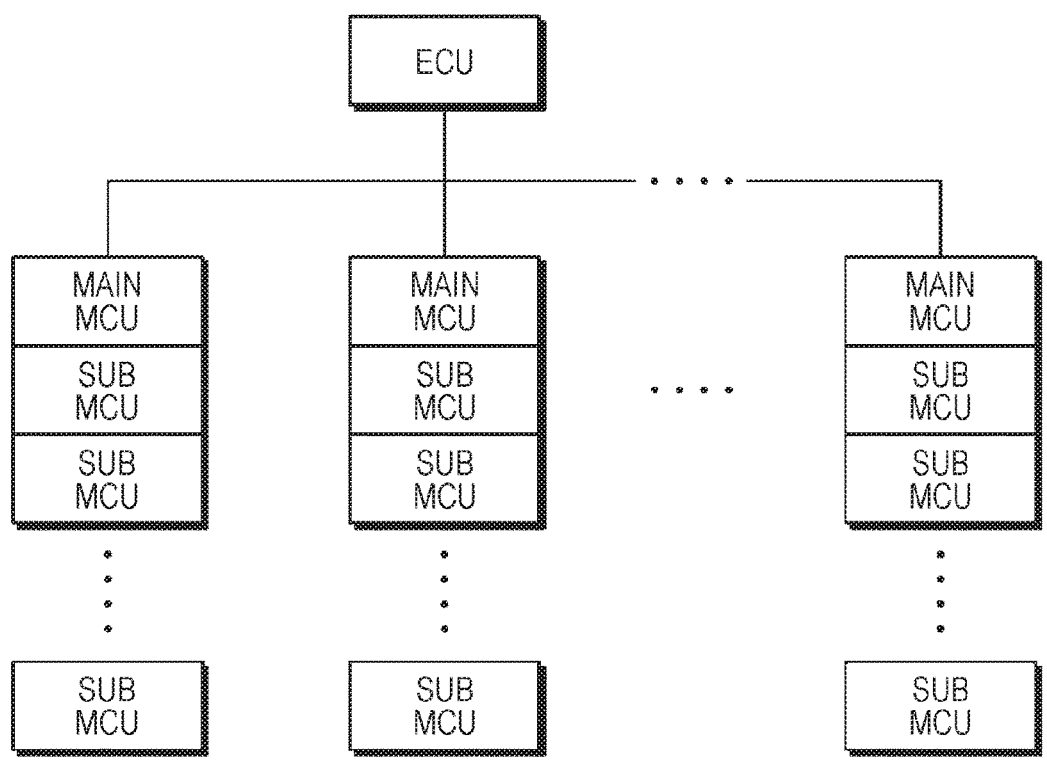
FIG. 3 is a block diagram showing the relationship among controllers in a power storage apparatus.

Further, in an embodiment of the present disclosure, as shown in FIG. 3, the sub control units (denoted by SUB MCU in the drawing) of respective power storage modules are connected to main micro-controller units (denoted by MAIN MCU in the drawing) so that the power storage modules are controlled. Further, the main micro-controller units are connected to an electronic control unit (denoted by ECU in the drawing) of the highest order. An electronic control unit is normally a unit that controls analog devices.

[Example of a Module Controller and a Main Controller]

Figure 4:
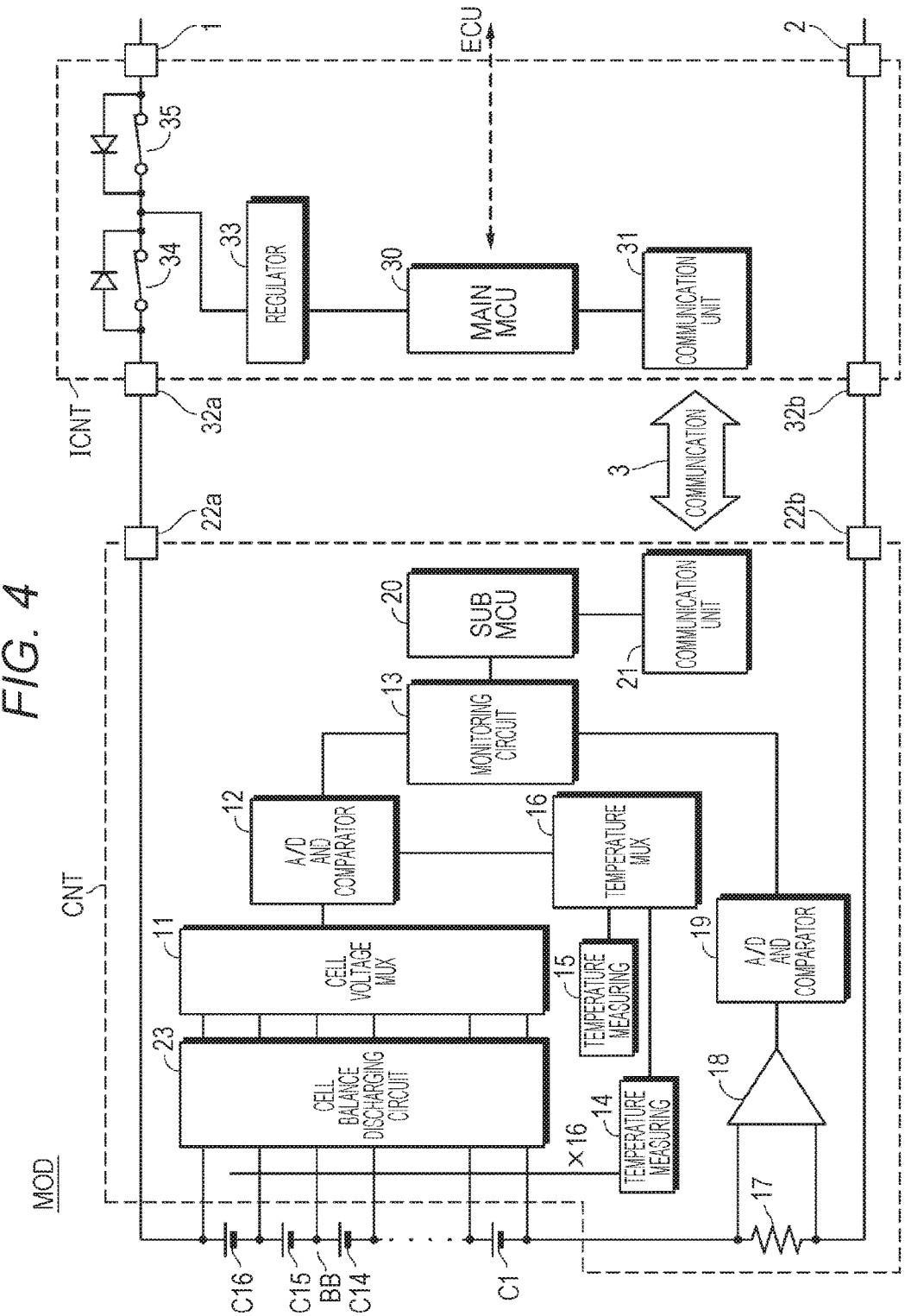
FIG. 4 is a block diagram showing a first embodiment of the control unit of a power storage module according to the present disclosure.

Referring now to FIG. 4, an example structure of a module controller CNT and a main controller ICNT is described. A power storage unit BB is formed with n (16, for example) battery cells (hereinafter referred to simply as cells where appropriate) C1 through C16 that are connected in series. The power storage unit BB may be formed with parallel-connected cells (sub modules) that are connected in series. The voltages of the respective cells are supplied to a cell voltage multiplexer 11, and the voltages of the cells C1 through C16 are sequentially selected and supplied to an A/D converter and comparator 12. Further, a cell balance discharging circuit 23 for causing the respective cells C1 through C16 to discharge in cell balance control is provided.

The voltages of the 16 cells are subjected to time-division multiplexing by the cell voltage multiplexer 11, and are converted into digital signals and are further compared with a voltage threshold by the A/D converter and comparator 12. The A/D converter and comparator 12 outputs 14- to 18-bit digital voltage data of the respective cells, and results (1-bit signals, for example) of the comparison between the voltages of the respective cells and the voltage threshold. The signals output from the A/D converter and comparator 12 are supplied to a monitoring circuit 13.

Further, a temperature measuring unit 14 that measures temperatures of the respective cells, and a temperature measuring unit 15 that measures temperature in the IC are provided. Temperature information from the temperature measuring units 14 and 15 is supplied to a temperature multiplexer 16. Temperature data multiplexed by the temperature multiplexer 16 is supplied to the A/D converter and comparator 12. The A/D converter and comparator 12 generates digital temperature data, and outputs results (1-bit signals, for example) of comparison between the digital temperature data and a temperature threshold. As described above, the A/D converter and comparator 12 also outputs results of comparison with respect to cell voltage data. Therefore, another A/D converter and comparator for temperature may also be provided.

A resistor 17 that detects the currents flowing in the power storage unit (the cells C1 through C16) is connected in series to the power storage unit BB. The voltages at both ends of the resistor 17 are supplied to an A/D converter and comparator 19 via an amplifier 18. The A/D converter and comparator 19 outputs digital current data and results (1-bit signals, for example) of comparison between current values and a current threshold. The signals output from the A/D converter and comparator 19 are supplied to the monitoring circuit 13.

Some of the 1-bit signals that are output from the A/D converter and comparator 12 are detection signals indicating normality/abnormality of the voltages of the respective cells. At a time of charging, the voltage of each cell is compared with a predetermined value, and a detection signal indicating whether the voltage is an overvoltage OV is generated. At a time of discharging, the voltage of each cell is compared with a predetermined value, and a detection signal indicating whether the voltage is an undervoltage UV is generated. The other 1-bit signals that are output from the A/D converter and comparator 12 are detection signals indicating an overtemperature OT. The 1-bit signals that are output from the A/D converter and comparator 19 are detection signals indicating an overcurrent OC.

The above described detection signals, voltage value data, current value data, and temperature data are supplied from the monitoring circuit 13 to a sub micro-controller unit 20. The monitoring circuit 13 and the sub micro-controller unit 20 are connected by serial communication, for example. Using the received detection signals, the sub micro-controller unit 20 performs a diagnosing process on the module controller CNT as necessary. The detection signals and data indicating results of the diagnosing process are output and supplied from the sub micro-controller unit 20 to a communication unit 21.

The communication unit 21 is the interface for conducting serial communication such as I2C communication with the main micro-controller unit of the main controller ICNT via the bus 3. The communication method herein can use a wired or wireless communication channel. Although not shown in FIG. 4, the sub micro-controller units of the module controllers of the other power storage modules are connected to the bus 3.

A positive terminal 22*a* and a negative terminal 22*b* of the power storage module MOD are connected to a positive terminal 32*a* and a negative terminal 32*b* of the main controller ICNT, respectively, via power supply lines.

A communication unit 31 of the main controller ICNT is connected to the bus 3. A main micro-controller unit 30 is connected to the communication unit 31, and communication being conducted through the communication unit 31 is controlled by the main micro-controller unit 30. Further, the main micro-controller unit 30 is connected to an electronic control unit ECU of the higher order via a communication channel.

A power supply voltage generated by a regulator 33 is supplied to the main micro-controller unit 30. The main controller ICNT includes a positive terminal 1 and a negative terminal 2. In the power supply output path, switching units 34 and 35 are inserted in series. These switching units 34 and 35 are controlled by the main micro-controller unit 30. The switching units 34 and 35 each include a switch element (such as a Field Effect Transistor (FET) or an Insulated Gate Bipolar Transistor (IGBT)), and a diode connected in parallel to the switch element.

When charging is prohibited, the switching unit 34 is switched off. When discharging is prohibited, the switching unit 35 is switched off. Further, when neither charging nor discharging is performed, the respective switch elements of the switching units 34 and 35 are switched off. The main micro-controller unit 30 transmits the data received from the power storage module MOD to the electronic control unit ECU of the higher order. Further, the main micro-controller unit 30 receives a control signal related to charging/discharging from the electronic control unit ECU.

[Cell Balance Discharging Circuit]

Figure 5:
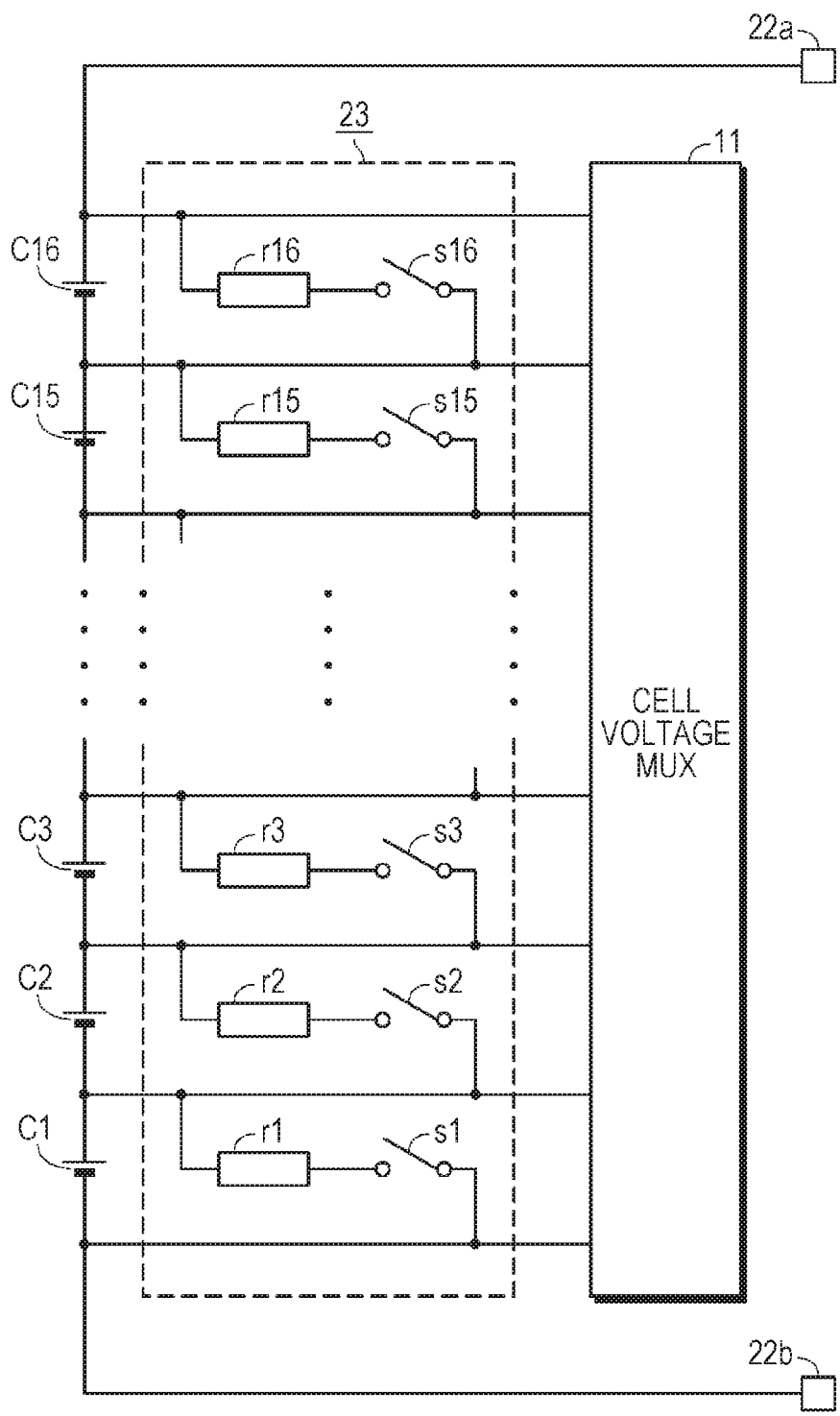
FIG. 5 is a connection diagram of a cell balance discharging circuit according to the first embodiment of the present disclosure.

FIG. 5 shows an example of the cell balance discharging circuit 23. A resistor r1 and a switch s1 are connected in parallel to the cell C1. Likewise, resistors r2 through r16 and switches s2 through s16 are connected in parallel to the cells C2 through C16, respectively. The switches s1 through s16 are formed with semiconductor switch elements such as FETs.

The switching on and off of the switches s1 through s16 is controlled by a switching control signal generated by the sub micro-controller unit 20, for example. When the switches s1 through s16 are switched on, the positive electrodes and the negative electrodes of the cells C1 through C16 are connected via the resistors r1 through r16, and the charges accumulated in the cells C1 through C16 are discharged. While a charging current is being supplied to the cells C1 through C16, when the switches s1 through s16 are switched on, the charging current is divided, and the substantial charging current decreases. For example, during a charging period, a switch that has been switched on maintains the on-state.

A charging circuit is connected to the positive terminal 1 and the negative terminal 2, to charge the cells C1 through C16. Charging is performed with a constant current. In the present disclosure, the charging current is gradually lowered. That is, the voltages of the respective cells are monitored by the monitoring circuit 13 at a time of charging. When the voltage of one of the cells reaches a predetermined current switching voltage V1, the current is lowered one level, and the switch (the cell balance discharging circuit 23) corresponding to the cell having the voltage that has reached the current switching voltage V1 is switched on. In this manner, increase in voltage is restrained. This operation is repeated, and, when a predetermined total voltage or the voltages of almost all the cells reach a charging completion voltage Vf, the charging is stopped.

[Control Operation]

Figure 6:
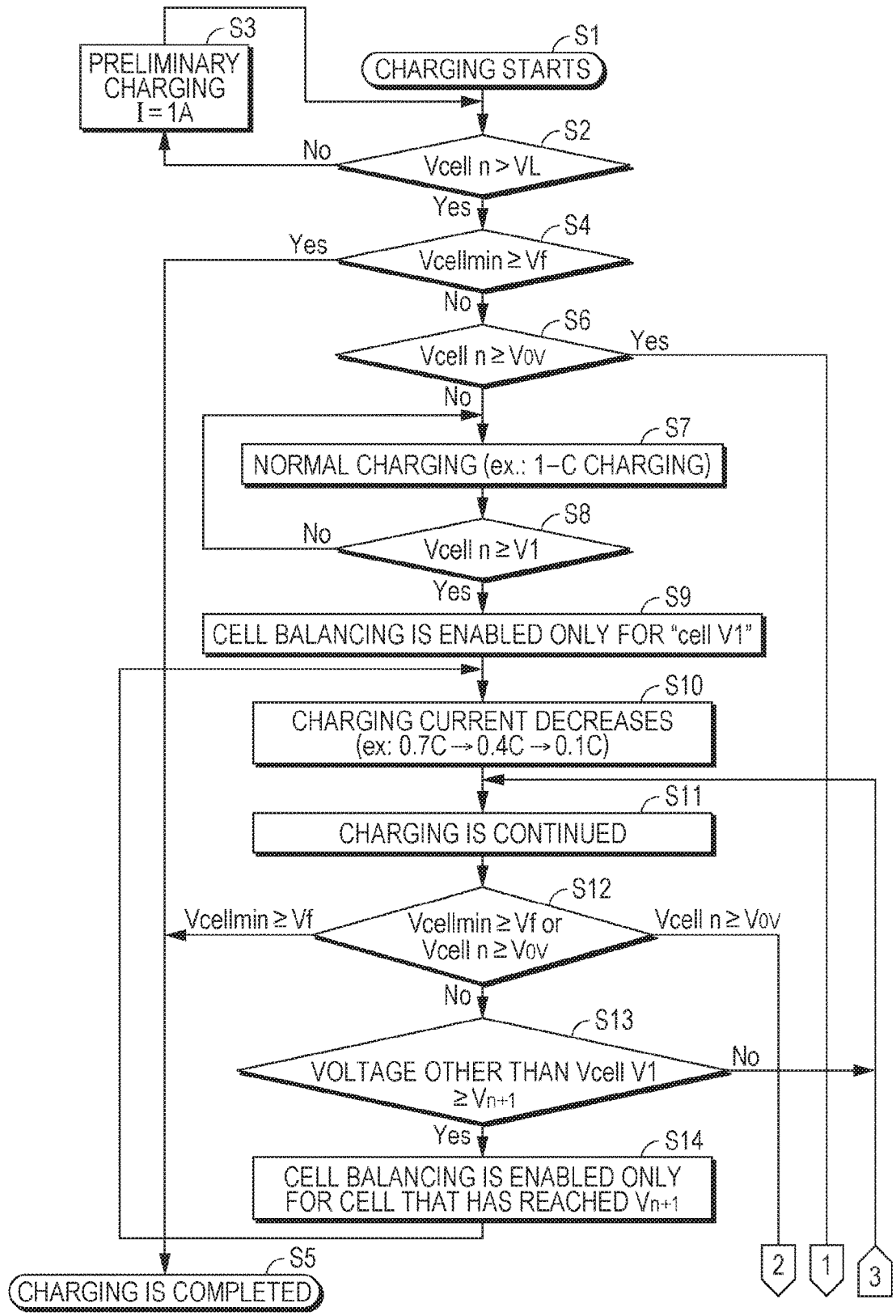
FIG. 6 is a flowchart showing the flow of a control process according to the first embodiment of the present disclosure.
Figure 7:
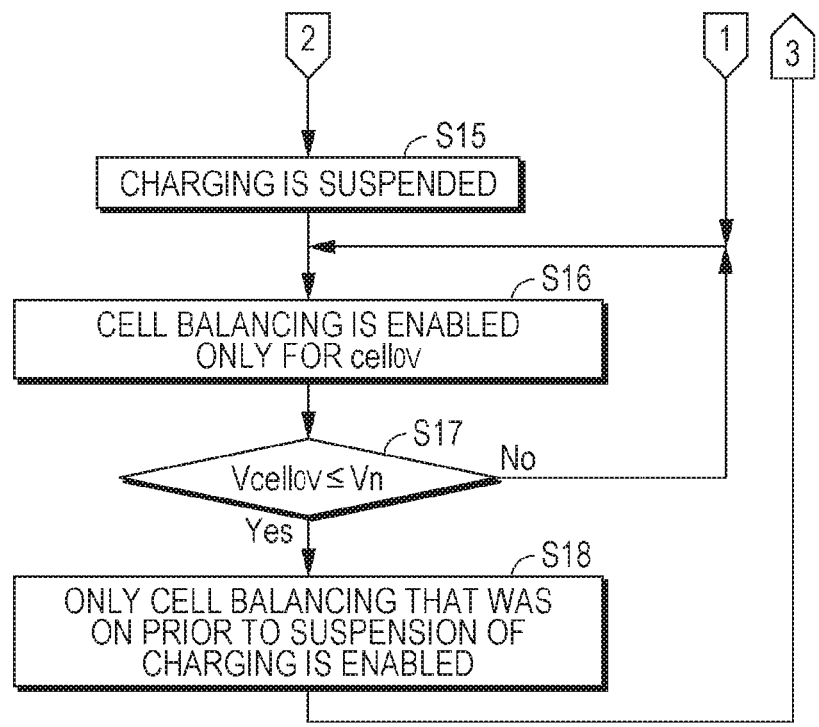
FIG. 7 is a flowchart showing the flow of the control process according to the first embodiment of the present disclosure.

Referring now to the flowcharts in FIGS. 6 and 7, the control process to be performed by the sub micro-controller unit 20 at a time of charging is described. FIGS. 6 and 7 show the flow of a single process, but the process is divided and shown in the two flowcharts due to limitations of space. The definitions of the symbols used in the description below are as follows.

Vcell n: the nth cell
Vcellmin: the lowest voltage among n cells
Vov: charging suspension voltage
Vf: charging completion voltage
Vcellov: the voltage of a cell that has reached the charging suspension voltage among the n cells
VL: discharging voltage
V1 through Vn: current switching voltages (discharging resistor on-voltages) (V1<V2<V3 . . . <Vn)
cellVn: a cell that has reached Vn For example, Vov is higher than Vf, Vov is set at 4.15 V, and Vf is set at 4.10 V. A voltage such as equal to or higher than 4.2 V, which is higher than Vov, is regarded as an overcharging voltage, and charging is prohibited. Further, the discharging voltage VL is set at 3.0 V. A voltage such as 2.3 V, which is lower than VL, is regarded as an overdischarging voltage, and discharging is prohibited. In reality, each voltage is allowed to have a margin of error. In the present disclosure, the secondary cells to be used are lithium ion secondary cells containing a positive-terminal active material, and a carbon material such as graphite as a negative-terminal active material, for example. The positive material is not particularly limited, but a material containing a positive-terminal active material having an olivine structure can be used. In a battery of this type, Vov is set at 3.55 V, and VL is set at 2.0 V, for example.

Step S1: Charging is started.
Step S2: A check is made to determine whether Vcell n is higher than VL. A check is made to determine whether the voltages of all the cells are higher than VL.

Step S3: If the result of the determination in step S2 is negative, preliminary charging is performed. In the preliminary charging, the charging current is set at 1 A, for example. The preliminary charging is continued until the result of the determination in step S2 turns positive.

Step S4: If the result of the determination in step S2 is positive, a check is made to determine whether Vcellmin is equal to or higher than Vf.

Step S5: If the result of the determination in step S4 is positive, the charging is completed.

Step S6: If the result of the determination in step S4 is negative, a check is made to determine whether Vcell n is equal to or higher than Vov. If the result of the determination in step S6 is positive, the process moves on to step S16 (FIG. 7).

Step S7: Normal charging is performed. For example, 1-C charging is performed. The 1-C charging involves a current value with which rated charging for a nominal capacity battery is completed in one hour (1 h). For example, in the case of a lithium ion secondary cell with a nominal capacity of 2.0 Ah, 1 C=2.0 Ah/1 h=2.0 A.

Step S8: A check is made to determine whether Vcell n is equal to or higher than V1. For example, the initial current switching voltage is set at V1=4.05 V. If this condition is not satisfied, the process returns to step S7.

Step S9: The cell balancing is enabled only for the cell that has reached the current switching voltage V1. That is, in the cell balance discharging circuit 23, the switch of the corresponding cell is switched on. Even if the cell having the cell balancing enabled reaches the current switching voltage Vn thereafter, any special process will not be performed for the cell.

Step S10: The charging current is switched to a smaller value. For example, the charging current starts at 1 C, and is then switched to 0.7 C. Further, every time the minimum voltage of the cell reaches a current switching voltage, the charging current is switched to 0.4 C, and then to 0.1 C.

Step S11: The charging with 0.7 C is continued.

Step S12: The same determination processes as those in step S4 and step S6 are performed. That is, a check is made to determine whether Vcellmin is equal to or higher than Vf. It the result is positive, the charging is completed (step S5). A check is made to determine whether Vcell n is equal to or higher than Vov. If the result is positive, the process moves on to step S15 (FIG. 7). In step S15, the charging is temporarily stopped. If any of these conditions is not satisfied, the process moves on to step S13.

Step S13: A check is made to determine whether a voltage other than Vcell V1 is equal to or higher than $V_{n+1}$ (such as V2). If this condition is not satisfied, the process returns to step S11 (the charging continues).

Step S14: The cell balancing is enabled only for the cell that has reached $V_{n+1}$. That is, in the cell balance discharging circuit 23, the switch of the corresponding cell is switched on. Even if the cell having the cell balancing enabled reaches a current switching voltage thereafter, any special process will not be performed for the cell. After step S14, the process moves on to step S10. In step S10, the charging current is further reduced. For example, the charging current is reduced from 0.7 C to 0.4 C.

Step S16: If the result of the determination in step S6 is positive, or if Vcell n is equal to or higher than Vov, the cell balancing is enabled only for cellov having the voltage equal to or higher than Vov.

Step S17: A check is made to determine whether Vcellov is equal to or lower than Vn. If this condition is not satisfied, the process returns to step S16 (the cell balancing is enabled only for cellov).

Step S18: If the condition in step S18 is satisfied, only the cell balancing that was on prior to the charging suspension process is enabled. The process then returns to step S11 (the charging continues) in FIG. 6.

First Example of Control According to the First Embodiment

Figure 8:
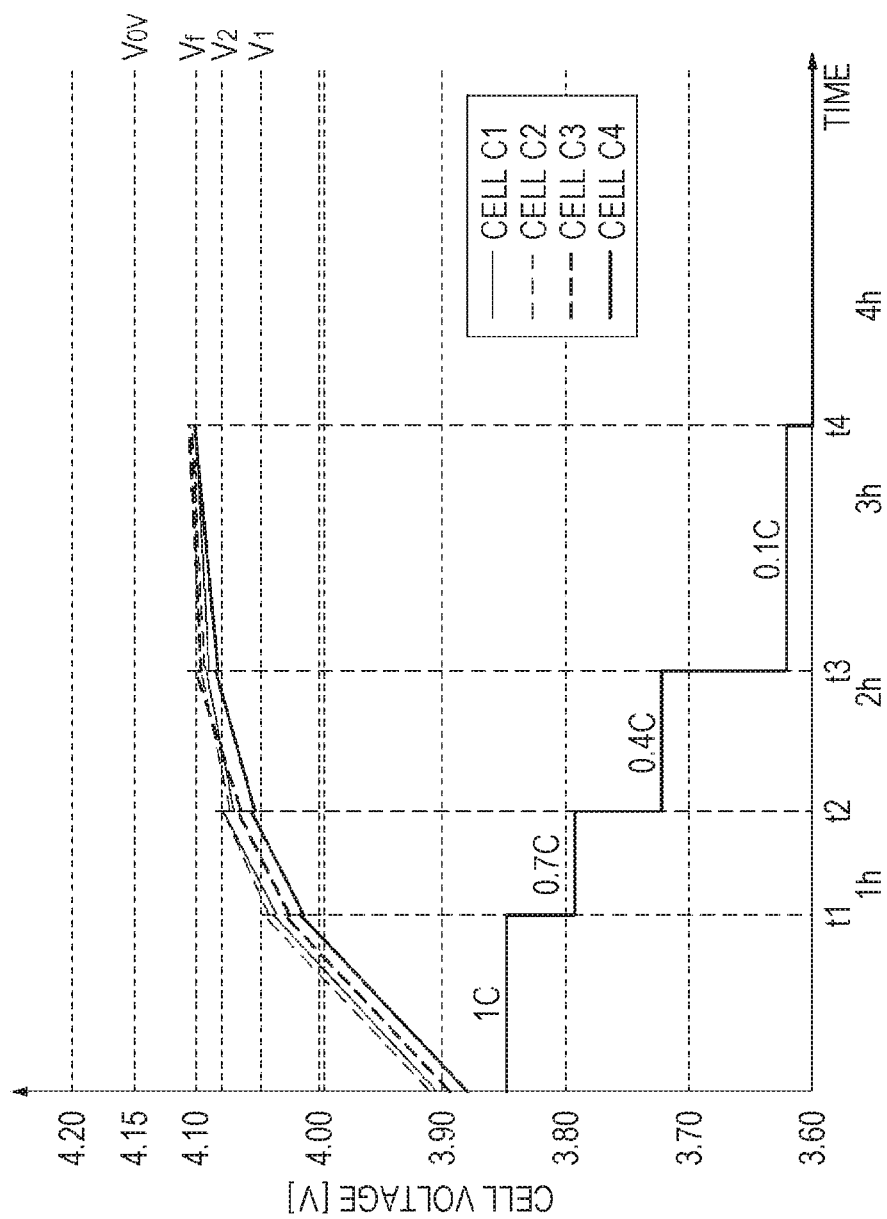
FIG. 8 shows graphs for explaining a first example of control according to the first embodiment of the present disclosure.

Referring to the graphs showing temporal changes in cell voltages in FIG. 8, a first example of control is described. The power storage unit BB is formed with four cells C1 through C4. Due to the differences in characteristics among the cells, the temporal change graphs differ from one another. First, the voltages of the cells C1 through C4 gradually become higher with 1-C charging.

When the voltage of the cell C2 reaches the current switching voltage V1 (4.05 V, for example) at time t1, the switch s2 of the cell balance discharging circuit 23 is switched on, and the charging current is reduced to 0.7 C (steps S8, S9, and S10 in FIG. 6). The charging is then continued (step S11). As the charging current is reduced, the voltage rise curve becomes gentler after time t1. Before time t1, the voltage rise curves of the respective cells run parallel to one another. Since the switch s2 is switched on at time t1, the voltage rise curve of the cell C2 becomes gentler than those of the other cells.

At time t2, a cell other than the cell C2, or the cell C1, for example, reaches the current switching voltage V2. Therefore, the switch s1 of the cell balance discharging circuit 23 is switched on, and the charging current is reduced to 0.4 C. As the charging current is reduced, the voltage rise curve becomes gentler after time t2. After time t2, the voltage rise curve of the cell C1 also becomes gentler than those of the other cells C3 and C4.

The charging is further continued, and the voltage of the cell C3 reaches the voltage Vf at time t3. Therefore, the switch s3 of the cell balance discharging circuit 23 is switched on, and the charging current is reduced to 0.1 C. After time t3, the voltage rise curve of the cell C3 also becomes gentler than that of the other cell C4.

The charging is further continued, and the voltage of the cell C4 reaches the voltage Vf at time t4. As the lowest voltage reaches the voltage Vf, the charging is completed (steps S12 and S5 in FIG. 6). In this manner, charging can be performed until the voltages of cells reach the charging completion voltage Vf.

In the above described first embodiment of the present disclosure, generation of a spike-like (whisker-like) voltage accompanying the switching on and off the charging current can be prevented. Furthermore, in the first embodiment of the present disclosure, the charging current for each cell with a high voltage is made smaller, so that the charging current can be reduced.

Second Example of Control According to the First Embodiment

Figure 9:
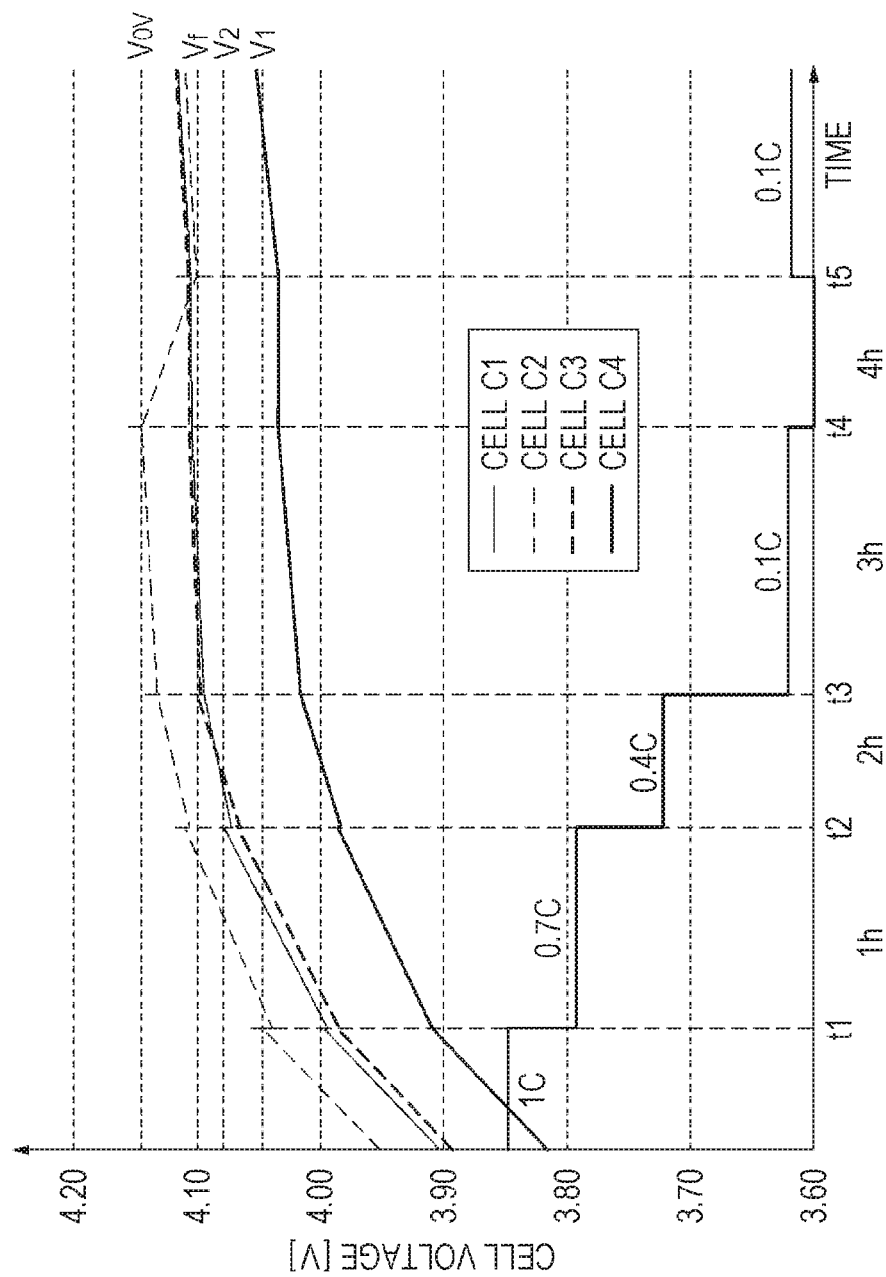
FIG. 9 shows graphs for explaining a second example of control according to the first embodiment of the present disclosure.
Figure 10:
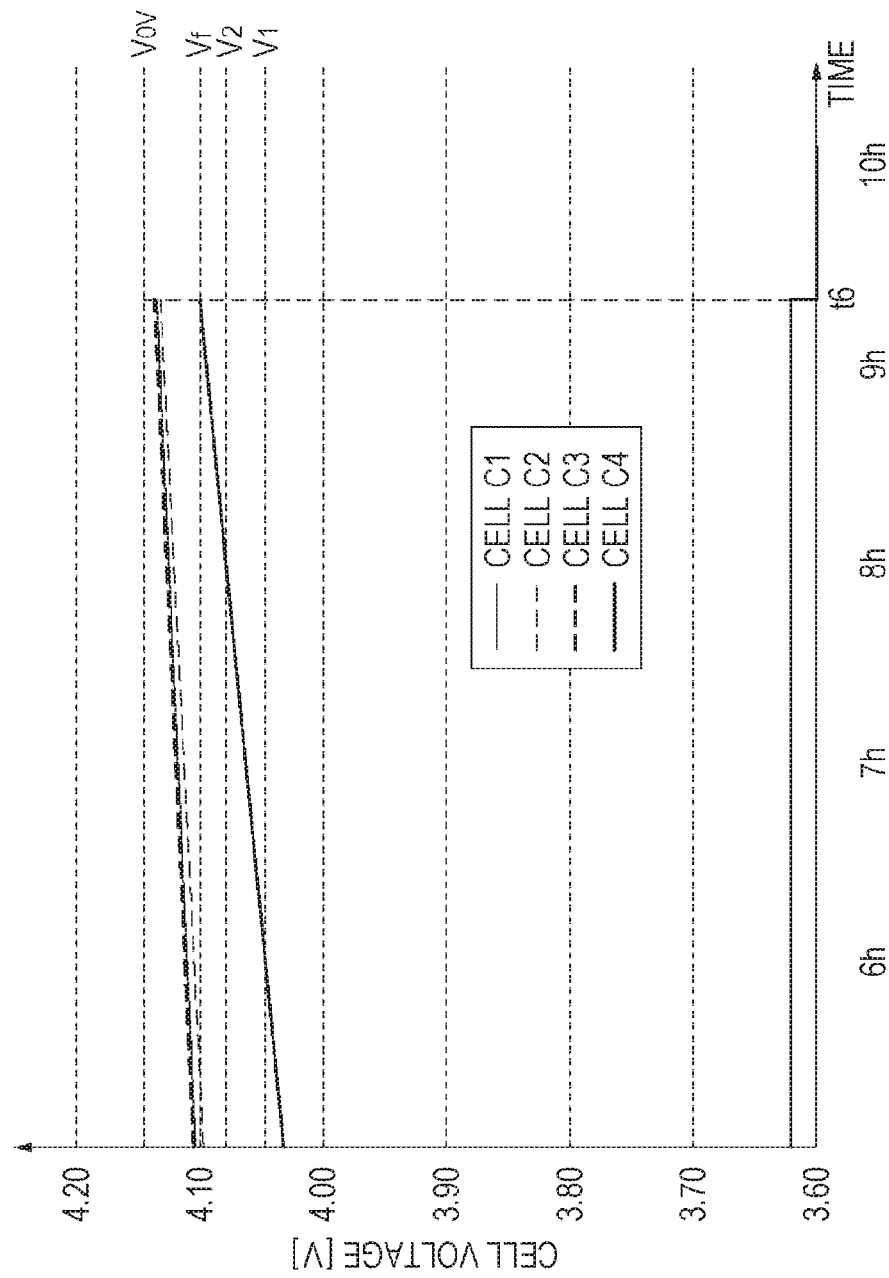
FIG. 10 shows graphs for explaining the second example of control according to the first embodiment of the present disclosure.

Referring to the graphs showing temporal changes in cell voltages in FIGS. 9 and 10, a second example of control is described. FIGS. 9 and 10 show one set of graphs showing temporally continuous changes, but the changes are divided and shown in the two drawings due to limitations of space. In this example, the power storage unit BB is formed with series-connected four cells C1 through C4, as in the above described first example. In the second example, the differences among the cells are significantly larger than those in the first example. First, the voltages of the cells C1 through C4 gradually become higher with 1-C charging.

When the voltage of the cell C2 reaches the current switching voltage V1 (4.05 V, for example) at time t1, the switch s2 of the cell balance discharging circuit 23 is switched on, and the charging current is reduced to 0.7 C (steps S8, S9, and S10 in FIG. 6). The charging is then continued (step S11). As the charging current is reduced, the voltage rise curve becomes gentler after time t1. Before time t1, the voltage rise curves of the respective cells run parallel to one another. Since the switch s2 is switched on at time t1, the voltage rise curve of the cell C2 becomes gentler than those of the other cells.

At time t2, a cell other than the cell C2, or the cell C1, for example, reaches the current switching voltage V2. Therefore, the switch s1 of the cell balance discharging circuit 23 is switched on, and the charging current is reduced to 0.4 C. As the charging current is reduced, the voltage rise curve becomes even gentler after time t2. After time t2, the voltage rise curve of the cell C1 also becomes gentler than those of the other cells C3 and C4.

At time t3, a cell other than the cells C1 and C2, or the cell C3, for example, reaches the current switching voltage Vn. Therefore, the switch s3 of the cell balance discharging circuit 23 is switched on, and the charging current is reduced to 0.1 C. As the charging current is reduced, the voltage rise curve becomes even gentler after time t3. After time t3, the voltage rise curve of the cell C3 also becomes gentler than that of the other cell C4.

After time t3, the voltage rise curves of the cells C1 through C3 have the same inclinations, but the inclination of the voltage rise curve of the cell C4 is higher than those of the cells C1 through C3. At time t4, the voltage of the cell C2 reaches the charging suspension voltage Vov. As a result of the determination in step S12 in FIG. 6, the process moves on to step S15 (FIG. 7), and the charging is temporarily stopped. As the cell balancing is enabled only for the cell C2, the voltage of the cell C2 becomes lower. At time t5, the charging is resumed. At time t6 in FIG. 10, the charging is stopped.

Figure 11:
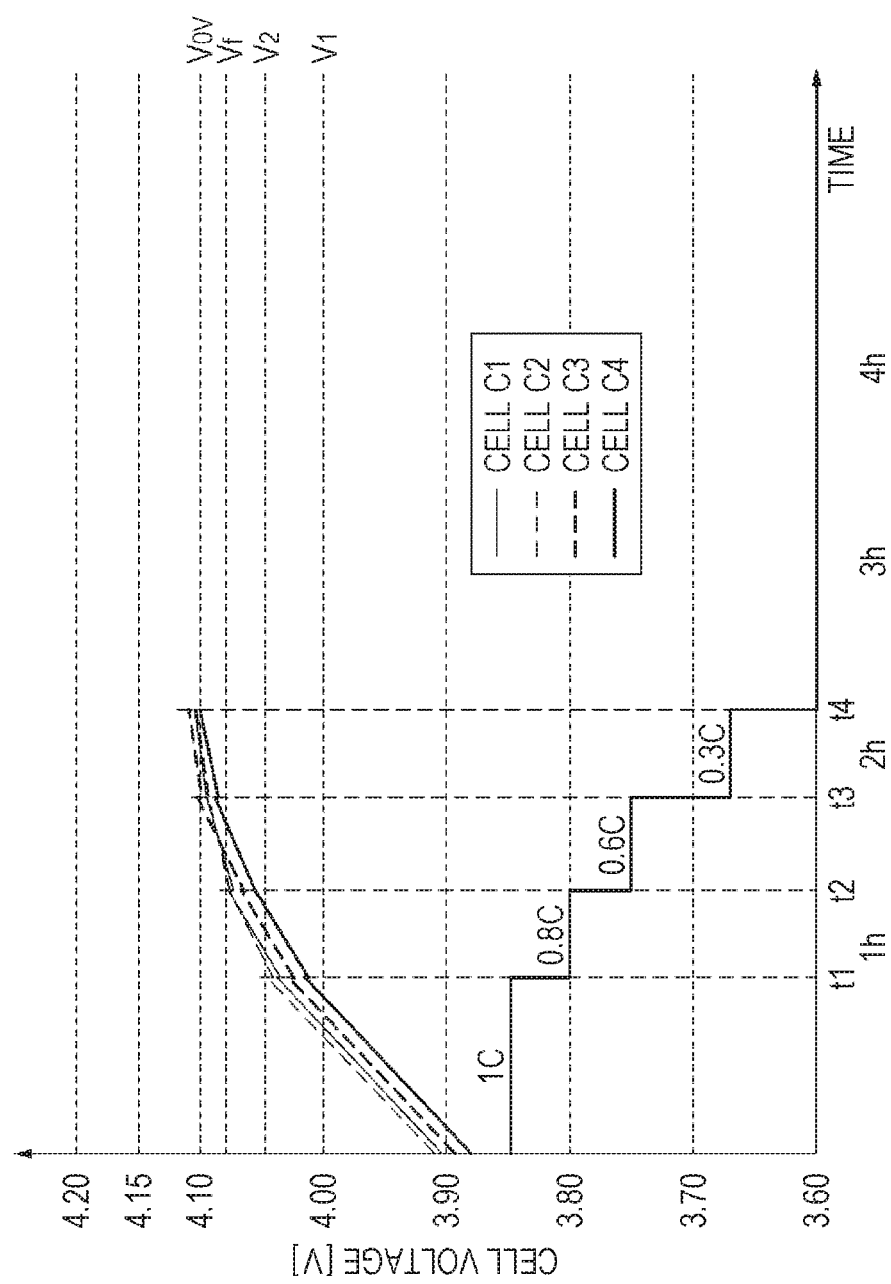
FIG. 11 shows graphs for explaining a modification of control according to the first embodiment of the present disclosure.

In the above described example case, the charging current is gradually switched from 1 C to 0.7 C to 0.4 C to 0.1 C. In a case where the charging current is switched from 1 C to 0.8 C to 0.6 C to 0.3 C, the time required for completing charging can be shortened as shown in FIG. 11.

In the above described first embodiment of the present disclosure, the charging current is not turned on and off, and generation of whisker-like noise accompanying switching can be prevented. Further, as the charging current is made smaller for a cell with a high voltage, the charging current can be reduced. This example can also be applied to a material having an olivine structure. In such a case, V is preferably set at 3.55 V. The other details are the same as above, and therefore, explanation of them is not made herein.

2. Second Embodiment of the Present Disclosure

Figure 12:
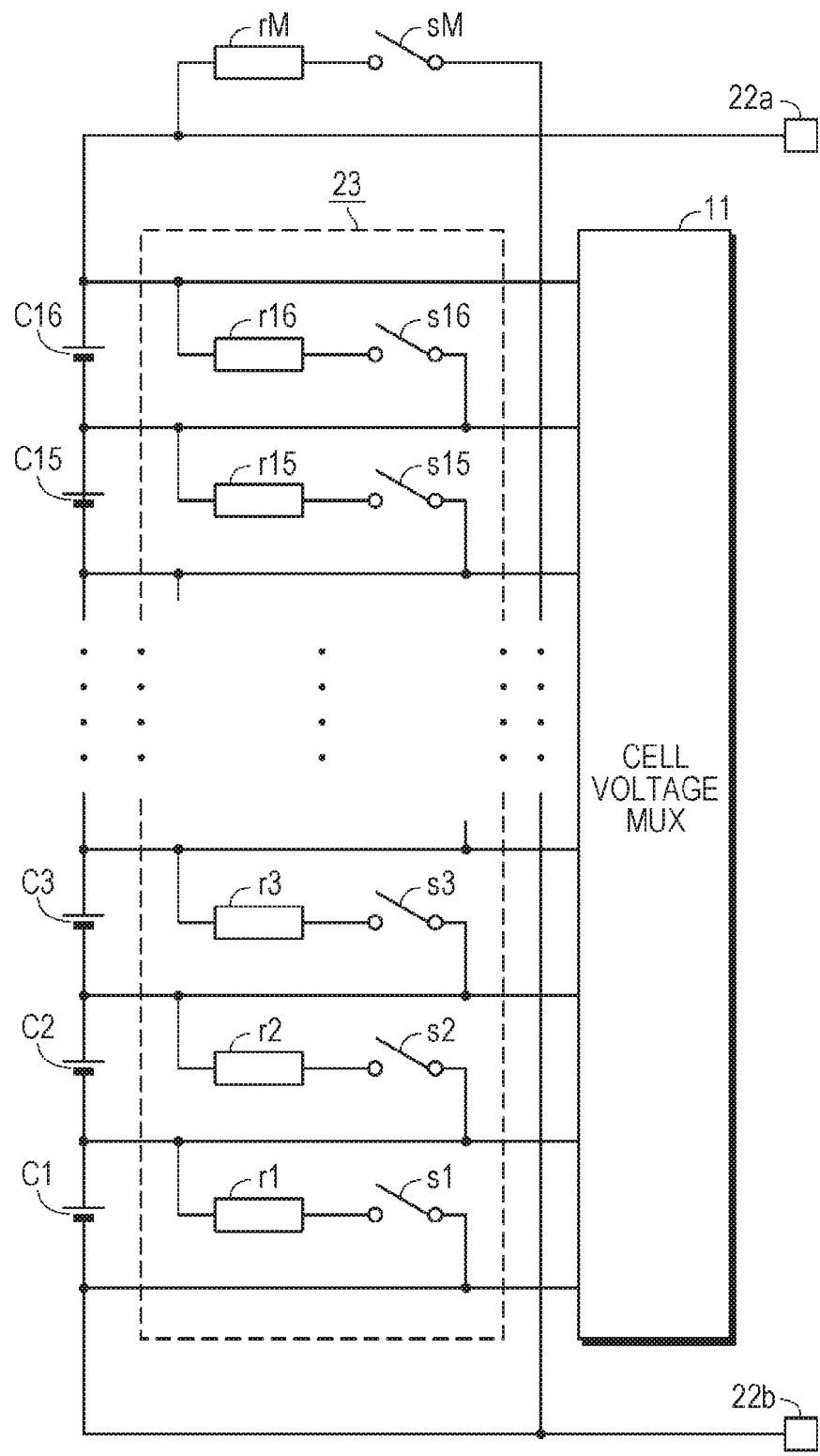
FIG. 12 is a connection diagram of a cell balance discharging circuit according to a second embodiment of the present disclosure.

As shown in FIG. 12, in a second embodiment of the present disclosure, a module balance discharging circuit is added to a cell balance discharging circuit 23. The module balance discharging circuit has a series circuit of a resistor rM and a switch sM connected between the positive side and the negative side of a series circuit of cells C1 through C16.

Therefore, when the switch sM is switched on, the resistor rM is inserted in parallel to the cells C1 through C16. Accordingly, when the switch sM is switched on at a time of charging, the charging current is made lower. The switch sM is switched on when the voltages of the cells C1 through C16 become higher than a module balancing on-voltage Vmb (>Vov) that is set in advance.

[Control Operation]

Figure 13:
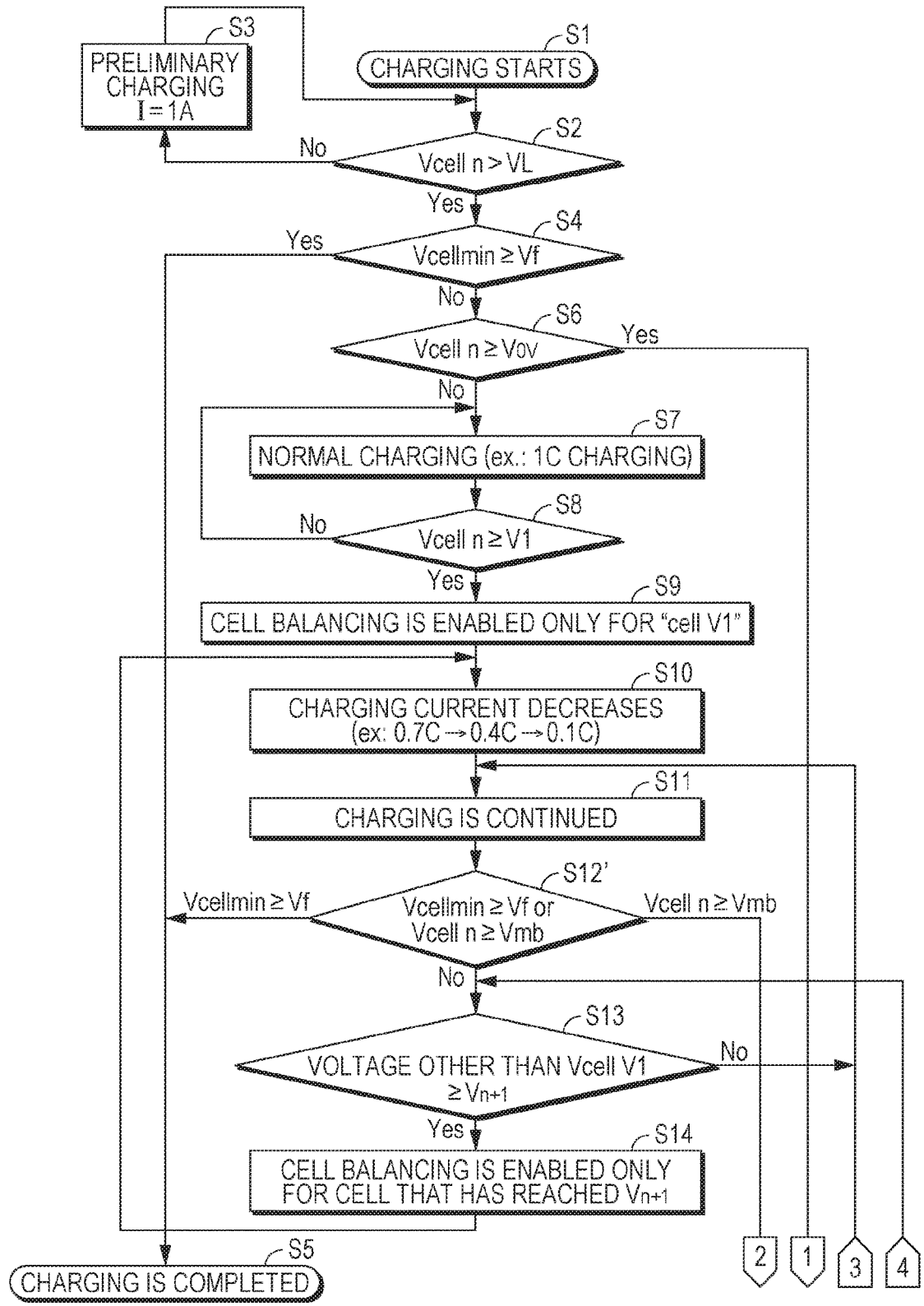
FIG. 13 is a flowchart showing the flow of a control process according to the second embodiment of the present disclosure.
Figure 14:
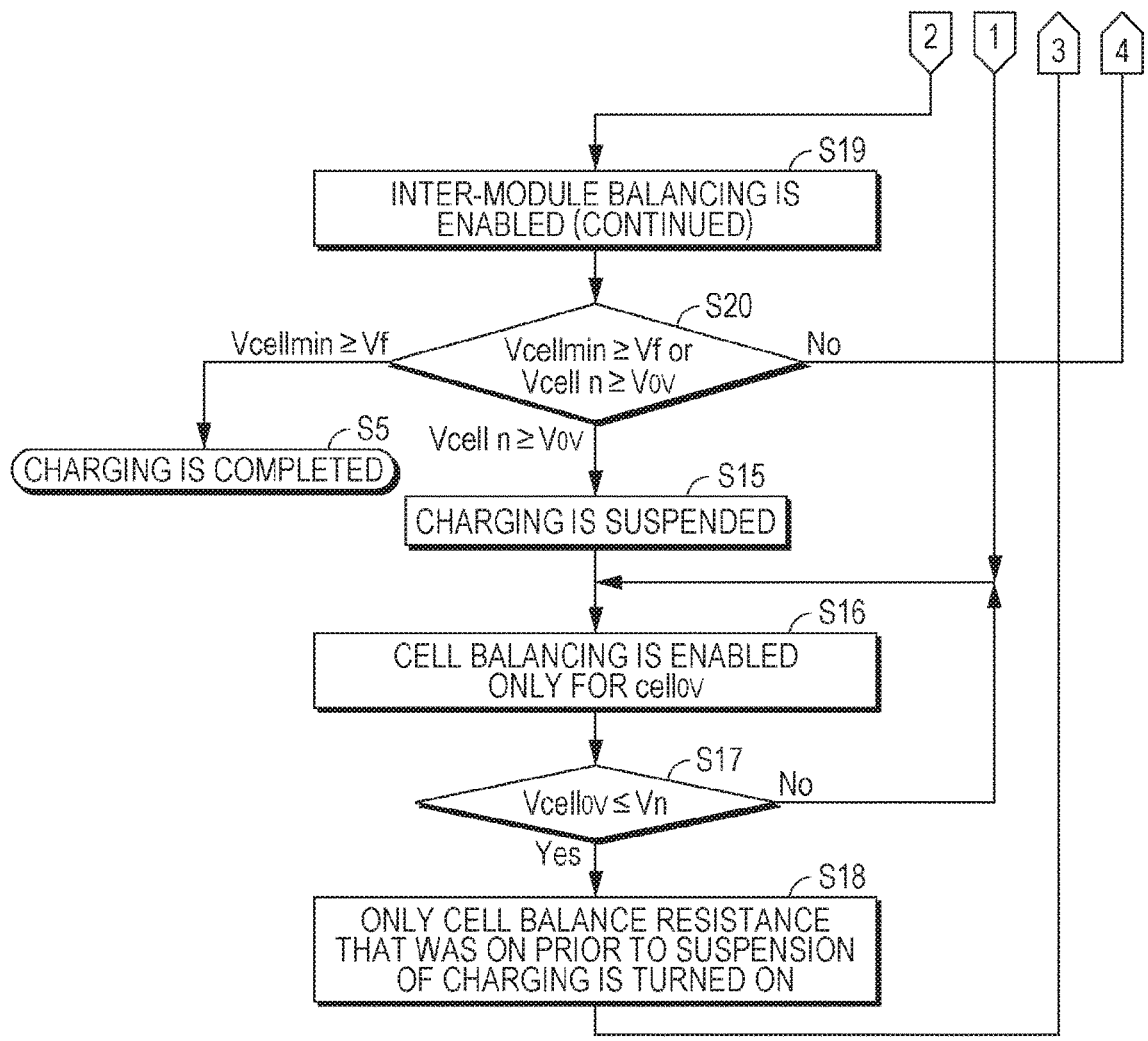
FIG. 14 is a flowchart showing the flow of the control process according to the second embodiment of the present disclosure.

Referring now to the flowcharts in FIGS. 13 and 14, the control process at a time of charging is described. FIGS. 13 and 14 show the flow of a single process, but the process is divided and shown in the two flowcharts due to limitations of space. The control operation is the same as the process according to the first embodiment, and FIG. 13 shows the same process as that shown in FIG. 6. However, in step S12', a check is made to determine whether Vcell n is equal to or higher than Vmb.

If the result of the above determination in step S12' is positive, the process moves on to step S19 in FIG. 14.

Step S19: The switch sM is switched on, and the inter-module balancing is enabled.

Step S20: A check is made to determine whether Vcellmin is equal to or higher than Vf. If the result of this determination is positive, the charging is completed (step S5). Also, a check is made to determine whether Vcell n is equal to or higher than Vov. If the result of the determination is negative, the process moves on to step S13 (FIG. 13).

If the result of the determination in step S20 is positive, the process moves on to step S15 (the charging is temporarily stopped). The process then moves on to step S16.

Step S16: If the result of the determination in step S6 is positive, or if Vcell n is equal to or higher than Vov, the cell balancing is enabled only for cell ov having the voltage equal to or higher than Vov.

Step S17: A check is made to determine whether Vcellov is equal to or lower than Vn. If this condition is not satisfied, the process returns to step S16 (the cell balancing is enabled only for cell ov).

Step S18: If the condition in step S18 is satisfied, only the cell balancing that was on prior to the charging suspension process is enabled. The process then returns to step S11 (the charging continues) in FIG. 13.

Example of Control According to the Second Embodiment

Figure 15:
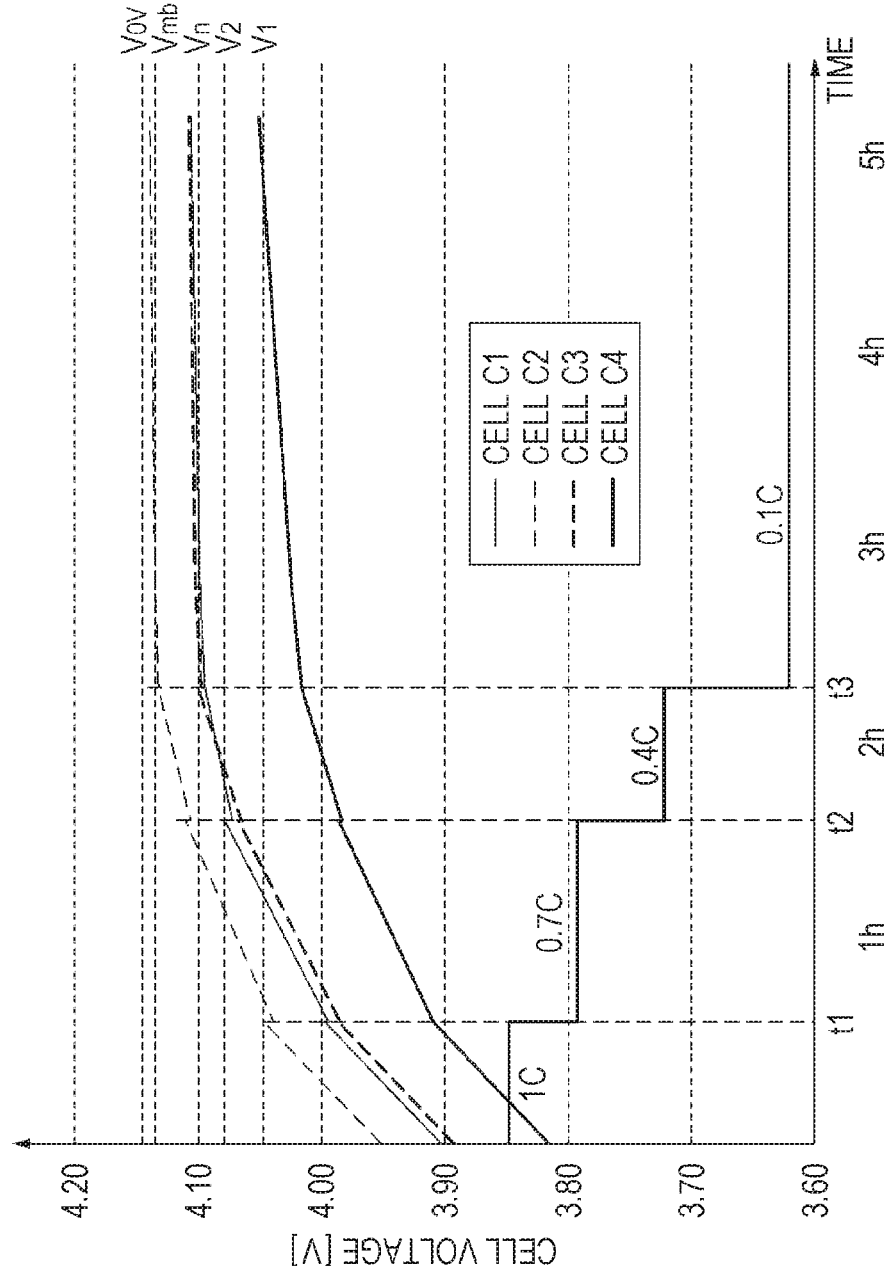
FIG. 15 shows graphs for explaining an example of control according to the second embodiment of the present disclosure.
Figure 16:
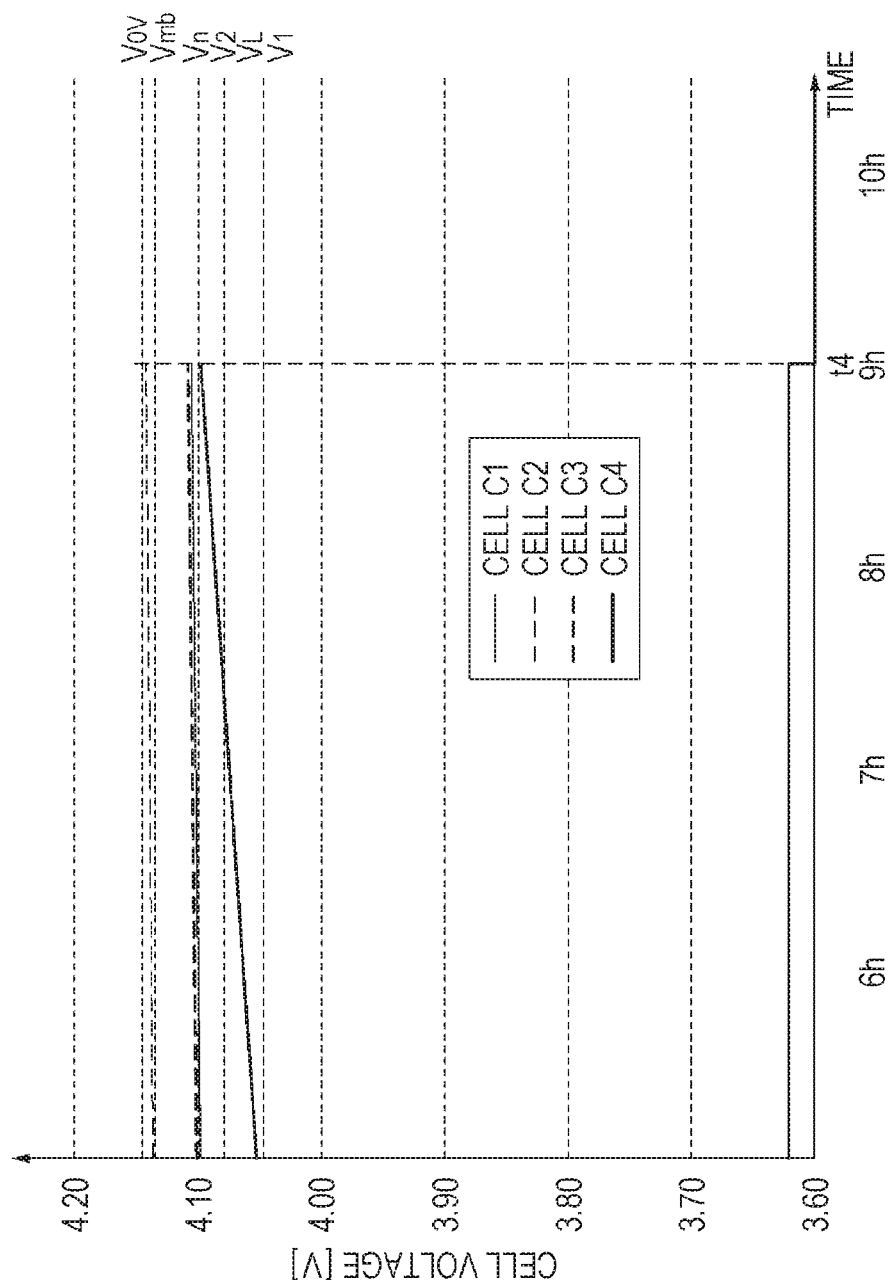
FIG. 16 shows graphs for explaining the example of control according to the second embodiment of the present disclosure.

Referring to the graphs showing temporal changes in cell voltages in FIGS. 15 and 16, an example of control according to the second embodiment is described. FIGS. 15 and 16 show one set of graphs showing temporally continuous changes, but the changes are divided and shown in the two drawings due to limitations of space. In this example, the power storage unit BB is formed with series-connected four cells C1 through C4, as in the above described examples in the first embodiment. First, the voltages of the cells C1 through C4 gradually become higher with 1-C charging.

When the voltage of the cell C2 reaches the current switching voltage V1 (4.05 V, for example) at time t1, the switch s2 of the cell balance discharging circuit 23 is switched on, and the charging current is reduced to 0.7 C. The charging is then continued. Before time t1, the voltage rise curves of the respective cells run parallel to one another. Since the switch s2 is switched on at time t1, the voltage rise curve of the cell C2 becomes gentler than those of the other cells. As the charging current is reduced, the voltage rise curve becomes gentler after time t1.

At time t2, a cell other than the cell C2, or the cell C1, for example, reaches the current switching voltage V2. Therefore, the switch s1 of the cell balance discharging circuit 23 is switched on, and the charging current is reduced to 0.4 C. After time t2, the voltage rise curve of the cell C1 also becomes gentler than those of the other cells C3 and C4. As the charging current is reduced, the voltage rise curve becomes even gentler after time t2.

At time t3, the voltage of the cell C2 becomes higher than the module balancing on-voltage Vmb. Accordingly, the module balancing is enabled. As the module balancing is enabled, the inclination of the voltage rise curve at the time of the charging becomes gentler. Also, as the voltage reaches Vov, the charting is not suspended. The charging with the low charging current continues, and, at time t4 in FIG. 16, Vcellmin becomes equal to or higher than Vf, and the charging is completed.

The present disclosure may also be embodied in the structures described below.

(1)

A power storage device including:

power storage units each including at least one battery, the power storage units being connected in series;

cell balance units connected in parallel to the respective power storage units via switches; and a control unit that performs control to charge the power storage units with a first constant current value, and, when the power storage unit having the highest voltage among the power storage units reaches a first potential, connect the corresponding one of the cell balance units to the power storage unit having the highest voltage, and switch the charging current to a second constant current value that is smaller than the first constant current value.

(2)

The power storage device of (1), wherein, when at least one power storage unit other than the power storage unit having the highest voltage among the power storage units reaches a second potential that is higher than the first potential, the control unit performs control to connect the corresponding one of the cell balance units to the power storage unit that has reached the second potential, and switch the charging current to a third constant current value that is smaller than the second constant current value.

(3)

The power storage device of (1) or (2), wherein the control unit is designed to set three or more threshold values for switching the charging current.

(4)

The power storage device of (1), (2), or (3), wherein, when the highest voltage among the power storage units reaches a charging suspension voltage that is higher than a predetermined voltage and is lower than an overcharging voltage, the charging is suspended, and only the power storage unit having the highest voltage is caused to discharge, and when the voltage of the power storage unit having the highest voltage becomes equal to a set voltage as a result of the discharging, the charging is resumed.

(5)

The power storage device of (1), (2), (3), or (4), wherein, when the lowest voltage among the power storage units becomes equal to or higher than a charging completion voltage, the charging is completed.

(6)

The power storage device of (1), (2), (3), (4), or (5), wherein, when the highest voltage among the power storage units reaches a second potential that is higher than the first potential, a switch of a balance unit connected in parallel to all the power storage units is switched on, and the constant current value is reduced.

(7)

The power storage device of (1), (2), (3), (4), (5), or (6), wherein the cell balance units each include a switch and a resistor that are connected in parallel to each corresponding one of the power storage units.

(8)

The power storage device of (1), (2), (3), (4), (5), (6), or (7), wherein the batteries included in the power storage units contain a positive-terminal active material having an olivine structure.

(9)

A method of controlling a power storage device that includes:

power storage units each including at least one battery, the power storage units being connected in series;

cell balance units connected in parallel to the respective power storage units via switches; and a control unit that controls the cell balance units, the method including performing control to charge the power storage units with a first constant current value, and, when the power storage unit having the highest voltage among the power storage units reaches a predetermined potential, connect the corresponding one of the cell balance units to the power storage unit having the highest voltage, and switch the charging current to a second constant current value that is smaller than the first constant current value, the control being performed by the control unit.

3. Applications

[Power Storage System in a Residence]

Figure 17:
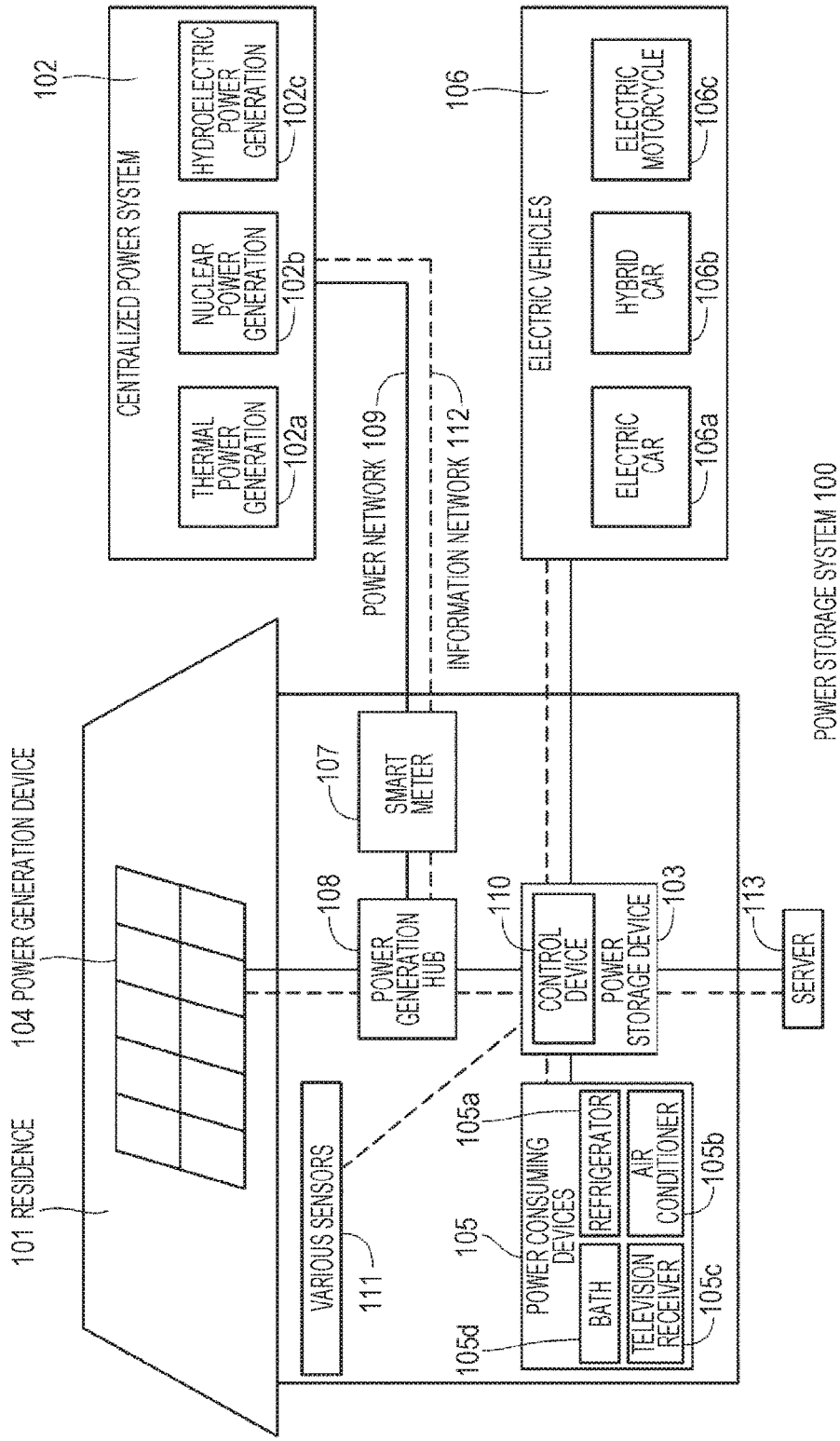
FIG. 17 is a block diagram of a first example application of the present disclosure.

Referring now to FIG. 17, an example where the present disclosure is applied to a power storage system for residence is described. In a power storage system 100 for a residence 101, for example, electric power is supplied to a power storage device 103 from a centralized power system 102 such as thermal power generation 102a, nuclear power generation 102b, and hydroelectric power generation 102c, via a power network 109, an information network 112, a smart meter 107, a power generation hub 108, and the like. In conjunction with this, electric power from an independent power supply such as a household power generating unit 104 is supplied to the power storage device 103. The supplied power is stored in the power storage device 103. With the power storage device 103, the electric power to be used in the residence 101 is fed to the residence 101. The same power storage system as above can be used not only in the residence 101 but also in an office building.

The power generating unit 104, power consuming devices 105, the power storage device 103, a control device 110 that controls the respective devices, the smart meter 107, and sensors 111 that acquires various kinds of information are provided in the residence 101. The respective devices are connected by the power network 109 and the information network 112. Solar cells, fuel cells, or the like are used as the power generating unit 104, and generated electric power is supplied to the power consuming devices 105 and/or the power storage device 103. The power consuming devices 105 are a refrigerator 105a, an air conditioner 105b, a television receiver 105c, a bath 105d, and the like. The power consuming devices 105 further include electric vehicles 106. The electric vehicles 106 are an electric car 106a, a hybrid car 106b, and an electric motorcycle 106c.

The above described power storage apparatus of the present disclosure is applied to the power storage device 103. The power storage device 103 is formed with secondary cells or capacitors. For example, the power storage device 103 is formed with lithium ion cells. The lithium ion cells may be of a stationary type, or may be used in the electric vehicles 106. The smart meter 107 has the function to measure commercial power usage, and transmit the measured usage to the electric power company. The power network 109 may be one of or a combination of a DC power supply, an AC power supply, and a non-contact power supply.

The various sensors 111 may be a motion sensor, an illuminance sensor, an object sensor, a power consumption sensor, a vibration sensor, a contact sensor, a temperature sensor, an infrared sensor, and the like. Information acquired by the various sensors 111 is transmitted to the control device 110. Weather conditions, the conditions of a person, and the like are determined from the information transmitted from the sensors 111, and the power consuming devices 105 can be automatically controlled so as to minimize energy consumption. Further, the control device 110 can transmit information about the residence 101 to an external electric power company or the like via the Internet.

The power generation hub 108 performs processing such as power line branching or DC-AC conversion. The communication method used by the information network 112 connected to the control device 110 may be a method using a communication interface such as Universal Asynchronous Receiver-Transmitter (UART), or a method using a sensor network compliant with wireless communication standards such as Bluetooth (a registered trade name), ZigBee, or Wi-Fi. Bluetooth (a registered trade name) is used in multimedia communication, and enables point-to-multipoint communication. ZigBee uses physical layers of Institute of Electrical and Electronics Engineers (IEEE) 802.15.4. IEEE802.15.4 is the name of short-range wireless network standards called Personal Area Network (PAN) or Wireless (W) PAN.

The control device 110 is connected to an external server 113. This server 113 may be managed by the residence 101, the electric power company, or the service provider. The information to be transmitted and received by the server 113 is power consumption information, life pattern information, electric power charges, weather information, natural hazard information, and information related to electricity trading, for example. These pieces of information may be transmitted and received by a power consuming device in the house (such as a television receiver), but may be transmitted and received by a device outside the house (such as a portable telephone device). These pieces of information may be displayed on a device having a display function, such as a television receiver, a portable telephone device, or a Personal Digital Assistant (PDA).

The control device 110 that controls the respective components is formed with a Central Processing Unit (CPU), a Random Access Memory (RAM), a Read Only Memory (ROM), and the like, and is included in the power storage device 103 in this example. The control device 110 is connected to the power storage device 103, the household power generating unit 104, the power consuming devices 105, the various sensors 111, and the server 113 by the information network 112, and has the function to adjust electricity usage and power generation, for example. Other than that, the control device 110 may have the function to conduct electricity trading in the electricity market.

As described above, not only electric power generated from the centralized power system 102 such as the thermal power generation 102*a*, the nuclear power generation 102*b*, and the hydroelectric power generation 102*c*, but also electric power generated from the household power generating unit 104 (solar power generation or wind power generation) can be stored in the power storage device 103. Accordingly, even when the electric power generated from the household power generating unit 104 varies, control can be performed so that the amount of power to be sent out can be made constant, and only the necessary amount of power is discharged. For example, while electric power obtained through solar power generation is stored in the power storage device 103, less expensive night-time electric power is stored in the power storage device 103 at night, so that the electric power stored in the power storage device 103 can be discharged and used in expensive hours during the day.

Although the control device 110 is included in the power storage device 103 in the above described example, the control device 110 may be included in the smart meter 107 or may be formed as an independent device. Further, the power storage system 100 may be used in households in an apartment building, or may be used in detached houses.

[Power Storage System in a Vehicle]

Figure 18:
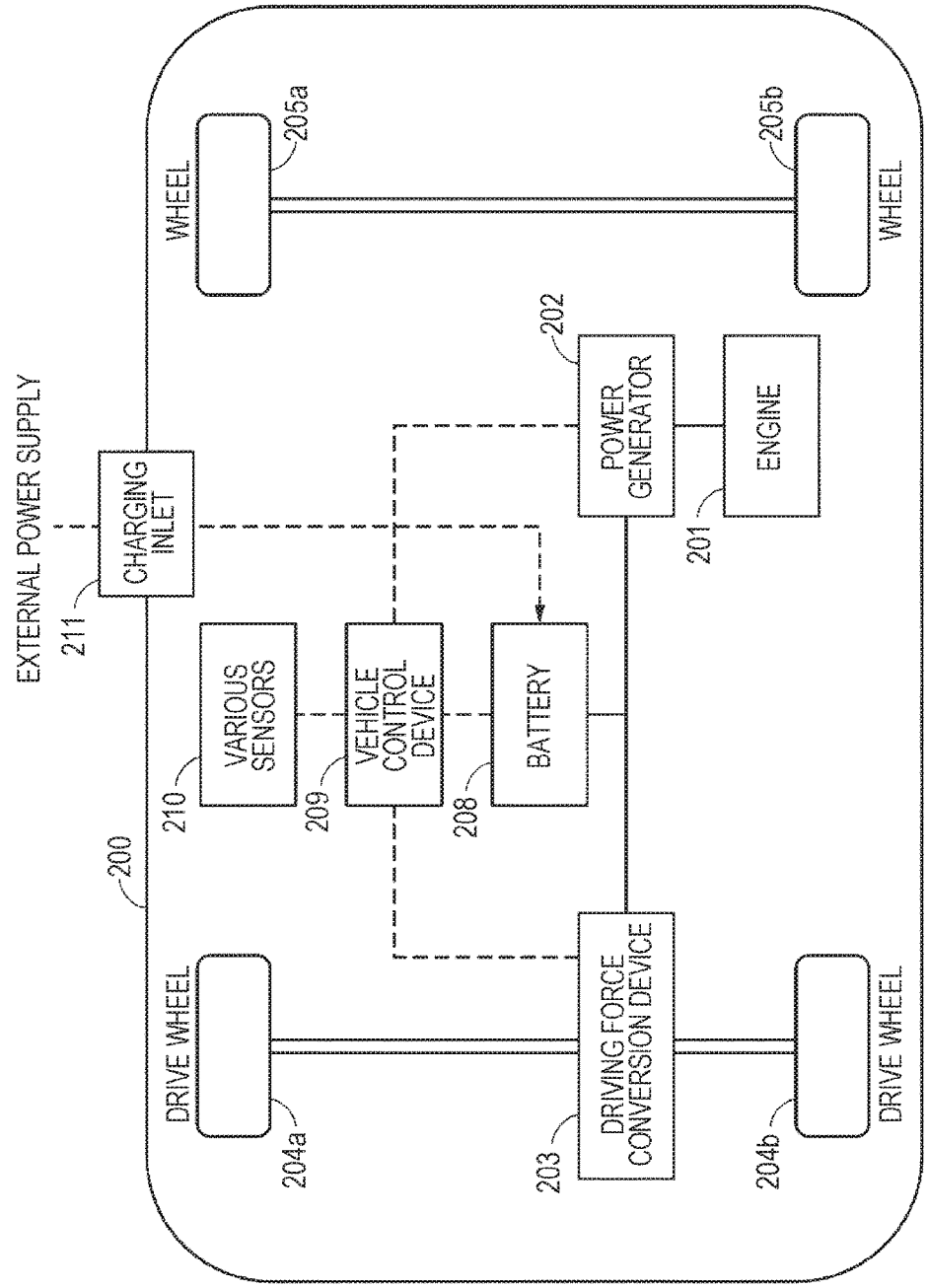
FIG. 18 is a block diagram of a second example application of the present disclosure.

Referring now to FIG. 18, an example where the present disclosure is applied to a power storage system for vehicles is described. FIG. 18 schematically shows an example structure of a hybrid vehicle that uses a series hybrid system to which the present disclosure is applied. A series hybrid system is a car that is powered by a drive power converter, using electric power generated by a generator that is run by an engine or the electric power that is temporarily stored in a battery.

This hybrid vehicle 200 includes an engine 201, a power generator 202, a driving force conversion device 203, a drive wheel 204*a*, a drive wheel 204*b*, a wheel 205*a*, a wheel 205*b*, a battery 208, a vehicle control device 209, various sensors 210, and a charging inlet 211. The above described power storage apparatus of the present disclosure is applied to the battery 208.

The hybrid vehicle 200 runs with the driving force conversion device 203 serving as the power source. An example of the driving force conversion device 203 is a motor. The driving force conversion device 203 is activated by the power of the battery 208, and the rotative force of the driving force conversion device 203 is transferred to the drive wheels 204*a* and 204*b*. As DC-AC conversion or reverse conversion (AC-DC conversion) is performed at appropriate sites, either an AC motor or a DC motor can be used as the driving force conversion device 203. The various sensors 210 control the engine revolving speed via the vehicle control device 209, and control the opening (throttle position) of a throttle valve (not shown). The various sensors 210 include a velocity sensor, an acceleration sensor, an engine revolving speed sensor, and the like.

The rotative force of the engine 201 is transferred to the power generator 202, and, by virtue of the rotative force, electric power generated by the power generator 202 can be stored in the battery 208.

As the hybrid vehicle slows down with a braking mechanism (not shown), the resisting force during the deceleration is applied as rotative force to the driving force conversion device 203, and regenerative power generated from the rotative force by the driving force conversion device 203 is stored in the battery 208.

The battery 208 can be connected to a power supply outside the hybrid vehicle, so as to receive a power supply from the external power supply through the charging inlet 211 serving as a power inlet, and store the received electric power.

Although not shown in the drawing, an information processing device that performs information processing related to vehicle control based on information about the secondary cells may be provided. Such an information processing device may be an information processing device that indicates a remaining battery level based on information about the remaining battery level.

In the above description, a series hybrid car that is powered by a motor using electric power generated by a power generator that is run by the engine or the electric power that is temporarily stored in the battery has been described as an example. However, the present disclosure can also be effectively applied to a parallel hybrid car that uses power outputs from both an engine and a motor serving as drive sources, and switches among three methods: being powered only by the engine, being powered only by the motor, being powered by both the engine and the motor. Furthermore, the present disclosure can also be effectively applied to a so-called electric vehicle that does not use an engine and is driven only by a drive motor.

4. Modifications

Although embodiments of the present disclosure have been specifically described so far, the present disclosure is not limited to the above embodiments, and various changes based on the technical idea of the present disclosure can be made to them. For example, the structures, the methods, the procedures, the shapes, the materials, the numerical values, and the like mentioned in the above described embodiments are merely examples, and structures, methods, procedures, shapes, materials, numerical values, and the like that differ from those mentioned above may be used as necessary. For example, the present disclosure can be applied to systems other than power storage systems.

REFERENCE SIGNS LIST

MOD, MOD1-MODN Power storage module
ICNT Main controller
CNT Module controller
C1-Cn Cell
BB1-BBn Power storage unit
3 Bus
11 Cell voltage multiplexer
12, 19 A/D converter and comparator
13 Monitoring circuit
16 Temperature multiplexer
20 Sub micro-controller unit
21 Communication unit
23 Cell balance discharging circuit
30 Main micro-controller unit
r1-r16, rM Resistance
s1-s16, sM Switch

The invention claimed is:

1. A power storage device, comprising:
a plurality of power storage units each including at least one battery, the plurality of power storage units being connected in series;
cell balance units connected in parallel to the respective plurality of power storage units via switches; and
a control unit configured to:
perform control to charge the plurality of power storage units with a first constant current value, and when a first power storage unit having a highest voltage among the plurality of power storage units reaches a first potential;
  connect a first cell balance unit of the cell balance units to the first power storage unit having the highest voltage, and
  switch a charging current to a second constant current value smaller than the first constant current value, the first cell balance unit corresponding to the highest voltage, and
when a second power storage unit of the plurality of power storage units other than the first power storage unit reaches a second potential higher than the first potential:
  connect a second cell balance unit of the cell balance units to the second power storage unit that reached the second potential, and
  switch the charging current to a third constant current value smaller than the second constant current value, the second cell balance unit corresponding to the second power storage unit that reached the second potential.

2. The power storage device according to claim 1, wherein the control unit is further configured to set three or more threshold values for switching the charging current.

3. The power storage device according to claim 1, wherein,
when the highest voltage reaches a charging suspension voltage that is higher than the first potential and is lower than an overcharging voltage, the charging is suspended, and only the first power storage unit having the highest voltage is caused to discharge, and
when a voltage of the first power storage unit having the highest voltage becomes equal to a set voltage as a result of the discharging, the charging is resumed.

4. The power storage device according to claim 1, wherein, when a lowest voltage among voltages of the plurality of power storage units becomes equal to or higher than a charging completion voltage, the charging is completed.

5. The power storage device according to claim 1, wherein, when the highest voltage reaches the second potential higher than the first potential, a switch of a third cell balance unit connected in parallel to all the plurality of power storage units is switched on, and a constant current value is reduced.

6. The power storage device according to claim 1, wherein each of the cell balance units includes a switch and a resistor that are connected in parallel to each corresponding one of the plurality of power storage units.

7. The power storage device according to claim 1, wherein the battery included in each of the plurality of power storage units contain a positive-terminal active material having an olivine structure.

8. A method of controlling a power storage device,
the power storage device including:
  a plurality of power storage units each including at least one battery, the plurality of power storage units being connected in series;
  cell balance units connected in parallel to the respective plurality of power storage units via switches; and
  a control unit configured to control the cell balance units, the method comprising:
performing, by the control unit, control to charge the plurality of power storage units with a first constant current value, and
when a first power storage unit having a highest voltage among the plurality of power storage units reaches a first potential;
  connecting a first cell balance unit of the cell balance units to the first power storage unit having the highest voltage, and
  switching a charging current to a second constant current value smaller than the first constant current value, the first cell balance unit corresponding to the highest voltage, and
when a second power storage unit of the plurality of power storage units other than the first power storage unit reaches a second potential higher than the first potential:
  connecting a second cell balance unit of the cell balance units to the second power storage unit that reached the second potential, and
  switching the charging current to a third constant current value smaller than the second constant current value, the second cell balance unit corresponding to the second power storage unit that reached the second potential.

* * * * *